(12) United States Patent
Chen

(10) Patent No.: US 8,457,206 B2
(45) Date of Patent: Jun. 4, 2013

(54) METHOD AND SYSTEM FOR ADAPTIVE TEMPORAL INTERPOLATION FILTERING FOR MOTION COMPENSATION

(75) Inventor: Xuemin Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1234 days.

(21) Appl. No.: 12/263,847

(22) Filed: Nov. 3, 2008

(65) Prior Publication Data

US 2010/0110304 A1    May 6, 2010

(51) Int. Cl.
*H04N 7/12* (2006.01)
*H04N 11/02* (2006.01)
*H04N 11/04* (2006.01)

(52) U.S. Cl.
USPC ..................................... 375/240.16; 375/240

(58) Field of Classification Search
USPC ..................................... 375/240.16
See application file for complete search history.

(56) References Cited

U.S. PATENT DOCUMENTS

| | | | | |
|---|---|---|---|---|
| 5,428,399 A | * | 6/1995 | Robinson et al. | 348/459 |
| 5,469,517 A | * | 11/1995 | Ohta | 382/252 |
| 5,539,469 A | | 7/1996 | Jung | |
| 7,206,453 B2 | | 4/2007 | Lee et al. | |

OTHER PUBLICATIONS

Herodotou, N.; Venetsanopoulos, A.N.;, "Colour image interpolation for high resolution acquisition and display devices," Consumer Electronics, IEEE Transactions on , vol. 41, No. 4, pp. 1118-1126, Nov. 1995.*

* cited by examiner

*Primary Examiner* — Edward Zee
*Assistant Examiner* — Yogesh Paliwal
(74) *Attorney, Agent, or Firm* — Thomas Horstemeyer, LLP

(57) ABSTRACT

Certain aspects of a method and system for adaptive temporal interpolation filtering for motion compensation may include computing a plurality of weights for adaptively adjusting one or more parameters of a plurality of linear filters utilized for motion compensation. One or more motion compensated output pictures may be generated based on vector median filtering a plurality of linear filtered output pictures generated by the plurality of linear filters. In instances where two frames are utilized for motion estimation of a video sequence, a motion compensated picture of a previous frame and a motion compensated picture of a current frame may be combined to adaptively compute the subsequent weights. In instances where three or more frames are utilized for motion estimation of a video sequence, the generated one or more motion compensated output pictures may be combined with an extracted desired picture from the video sequence to adaptively compute the subsequent weights.

22 Claims, 17 Drawing Sheets

METHOD AND SYSTEM FOR ADAPTIVE TEMPORAL INTERPOLATION FILTERING FOR MOTION COMPENSATION

CROSS-REFERENCE TO RELATED APPLICATIONS/INCORPORATION BY REFERENCE

Not Applicable

FEDERALLY SPONSORED RESEARCH OR DEVELOPMENT

Not Applicable

MICROFICHE/COPYRIGHT REFERENCE

Not Applicable

FIELD OF THE INVENTION

Certain embodiments of the invention relate to digital video processing. More specifically, certain embodiments of the invention relate to a method and system for adaptive temporal interpolation filtering for motion compensation.

BACKGROUND OF THE INVENTION

A major revolution in video display technology includes flat screens based on either liquid crystal display (LCD) or plasma display panel (PDP) technology that are rapidly replacing the cathode ray tube (CRT) technology that served as the primary display device for more than a half a century. A significant consequence of the new video display technologies is that pictures may now be displayed at higher picture-rates with progressive scanning on a flat screen. The new video display technologies may also facilitate a faster transition from standard definition television (SDTV) to high-definition television (HDTV). However, legacy video compression systems still use formats with lower picture-rates and may be unable to optimally display legacy video on modern display screens.

There may be restrictions on channel capacity that may affect the display of low picture-rate pictures. For example, considering a 30 Hz video sequence that may be broadcast over a mobile network, the terminals, for example, mobile phones may receive an encoded video sequence from a server. However, due to bandwidth limitations, only a low bit-rate video sequence may be communicated. As a result, the encoder may remove two out of every three pictures to be transmitted, resulting in a sequence with a picture rate of about 10 Hz, for example. The terminal may be capable of displaying video at 30 Hz but since it receives a 10 Hz video, it may have to perform some form of picture-rate conversion.

The available channel capacity may be different in diverse video services. The legacy systems may be different in different regions of the world, for example, NTSC, SECAM or PAL. The picture rate requirements may differ depending on applications and users. Picture-rate conversion may be required in a plurality of applications in order to adapt to a wide variety of display systems. The video picture rate up-conversion may be divided into one or more categories, for example, conversion from interlace to progressive scan or 50/60 Hz interlace to 50/60 Hz progressive, picture rate doubling, for example, 50 Hz to 100 Hz or 60 Hz to 120 Hz, non-integer scan rate conversion, for example, 50 Hz to 60 Hz.

An artifact known as "motion judder" may occur when the picture rate of a video sequence is excessively low. Motion judder may occur when the temporal sampling rate is too low to describe motion in a scene. The objects in input pictures may be shifted on either side of a required output picture. A temporal digital filter interpolation method may be used to determine pixel intensity values. The signals describing motion of each of the objects within a scene may be referred to as motion vectors. Each picture or region with the same movement may be allocated a motion vector. The motion estimation system may determine these motion vectors and failing to find a correct motion vector and/or misusing the motion vector in a picture rate converter may lead to noticeable artifacts. When large camera movements occur, regions of a picture close to the borders may have significantly less reliable motion vectors than those closer to the middle and special processing may be required at the picture boundaries.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for adaptive temporal interpolation filtering for motion compensation, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a system and/or method for adaptive temporal interpolation filtering for motion compensation. Certain aspects of a method may comprise computing a plurality of weights for adaptively adjusting one or more parameters of a plurality of linear filters utilized for motion compensation. One or more motion compensated output pictures may be generated based on vector median filtering a plurality of linear filtered output pictures generated by the plurality of linear filters. In instances where two frames are available for motion estimation of a video sequence, the motion compensated pictures of a previous frame and a current frame may be combined to adaptively compute a plurality of subsequent weights. In instances where three or more frames are available for motion estimation of a video sequence, the generated one or more motion compensated output pictures may be combined with an extracted desired picture from the video sequence to adaptively compute a plurality of subsequent weights.

Figure 1:
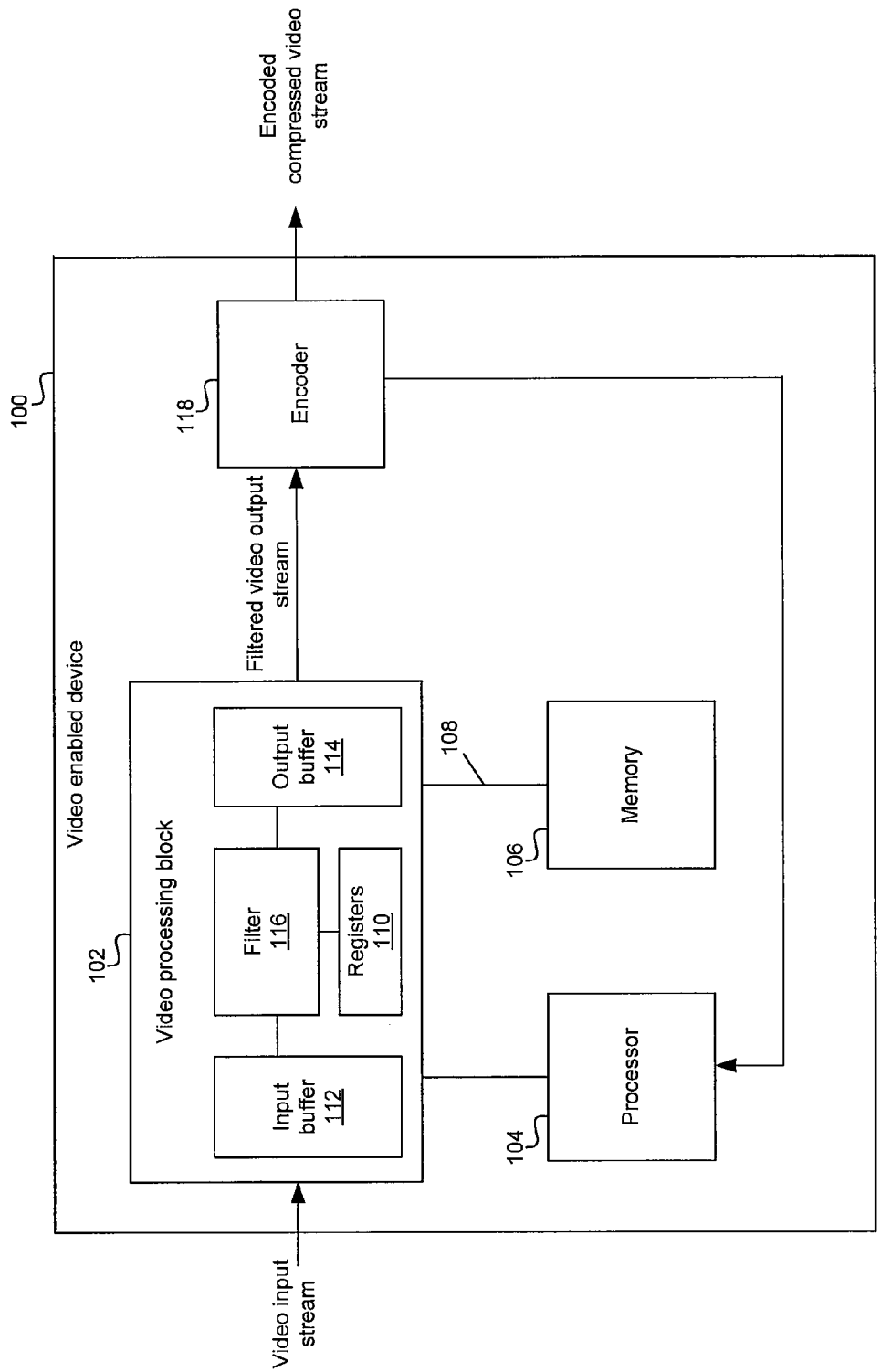
FIG. 1 is a block diagram of an exemplary video processing system, in accordance with an embodiment of the invention.

FIG. 1 is a block diagram of an exemplary video processing system, in accordance with an embodiment of the invention. Referring to FIG. 1, there is shown a video enabled device 100. The video enabled device 100 may comprise a video processing block 102, a processor 104, a memory 106, an encoder 118 and a data/control bus 108. The video processing block 102 may comprise registers 110 and filter 116. In some instances, the video processing block 102 may also comprise an input buffer 112 and/or an output buffer 114. The video processing block 102 may comprise suitable logic, circuitry, and/or code that may be enabled to filter pictures in a video picture or a video picture from a video input stream to reduce noise. For example, video frame pictures may be utilized in video systems with progressive video signals while video field pictures may be utilized in video systems with interlaced video signals. Video fields may alternate parity between top fields and bottom fields. A top field and a bottom field in an interlaced system may be deinterlaced or combined to produce a video frame.

The video processing block 102 may be enabled to receive a video input stream and, in some instances, to buffer at least a portion of the received video input stream in the input buffer 112. In this regard, the input buffer 112 may comprise suitable logic, circuitry, and/or code that may be enabled to store at least a portion of the received video input stream. Similarly, the video processing block 102 may be enabled to generate a filtered video output stream to a video decoder and, in some instances, to buffer at least a portion of the generated filtered video output stream in the output buffer 114. In this regard, the output buffer 114 may comprise suitable logic, circuitry, and/or code that may be enabled to store at least a portion of the filtered video output stream.

The filter 116 in the video processing block 102 may comprise suitable logic, circuitry, and/or code that may be enabled to perform filtering operation with noise reduction on the current picture. In this regard, the filter 116 may be enabled to operate in a plurality of filtering modes, where each filtering mode may be associated with one of a plurality of supported filtering operations. The filter 116 may utilize video content, filter coefficients, threshold levels, and/or constants to generate the filtered video output stream in accordance with the filtering mode selected. In this regard, the video processing block 102 may generate blending factors to be utilized with the appropriate filtering mode selected. The registers 110 in the video processing block 102 may comprise suitable logic, circuitry, and/or code that may be enabled to store information that corresponds to filter coefficients, threshold levels, and/or constants, for example. Moreover, the registers 110 may be enabled to store information that corresponds to a selected filtering mode.

The processor 104 may comprise suitable logic, circuitry, and/or code that may be enabled to process data and/or perform system control operations. The processor 104 may be enabled to control at least a portion of the operations of the video processing block 102. For example, the processor 104 may generate at least one signal to control the selection of the filtering mode in the video processing block 102. Moreover, the processor 104 may be enabled to program, update, and/or modify filter coefficients, threshold levels, and/or constants in at least a portion of the registers 110. For example, the processor 104 may generate at least one signal to retrieve stored filter coefficients, threshold levels, and/or constants that may be stored in the memory 106 and transfer the retrieved information to the registers 110 via the data/control bus 108.

The memory 106 may comprise suitable logic, circuitry, and/or code that may be enabled to store information that may be utilized by the video processing block 102 to reduce noise in the video input stream. The memory 106 may be enabled to store filter coefficients, threshold levels, and/or constants, for example, to be utilized by the video processing block 102.

The encoder 118 may be enabled to receive and process a plurality of statistical inputs from the processor 104 and the video processing block 102. The encoder 118 may be enabled to generate the encoded compressed video stream based on encoding the filtered video output stream.

In operation, the processor 104 may select a filtering mode of operation and may program the selected filtering mode into the registers 110 in the video processing block 102. Moreover, the processor 104 may program the appropriate values for the filter coefficients, threshold levels, and/or constants into the registers 110 in accordance with the selected filtering mode. The video processing block 102 may receive the video input stream and may filter pictures in a video picture in accordance with the selected filtering mode. In some instances, the video input stream may be stored in the input buffer 112 before processing. The video processing block 102 may generate the appropriate blending factors needed to perform the noise reduction filtering operation selected by the processor 104. The video processing block 102 may generate the filtered video output stream after performing the noise reduction filtering operation. In some instances, the filtered video output stream may be stored in the output buffer 114 before being transferred out of the video processing block 102.

The processor 104 may determine the mode of operation of various portions of the video processing block 102. For example, the processor 104 may configure data registers in the video processing block 102 to allow direct memory access (DMA) transfers of video data to the memory 106. The processor 104 may also communicate instructions to an image sensor to initiate capturing of images. The memory 106 may be used to store image data that may be processed and communicated by the processor 104. The memory 106 may also be used for storing code and/or data that may be used by the processor 104. The memory 106 may also be used to store data for other functionalities of the video processing block 102. For example, the memory 106 may store data corresponding to voice communication. The processor 104 may comprise a state machine that may enable determination of whether video data type is interlaced type or progressive type.

The processor 104 may be enabled to compute a plurality of weights for adaptively adjusting one or more parameters of the linear filter 116 utilized for motion compensation. In instances where two frames are utilized for motion estimation of a video sequence, the video processing block 102 may be enabled to combine the motion compensated pictures of a previous frame and a current frame to adaptively compute a plurality of subsequent weights. In instances where three or more frames are utilized for motion estimation of a video sequence, the video processing block 102 may be enabled to extract a desired picture from the video sequence and combine one or more motion compensated output pictures with the extracted desired picture from the video sequence to adaptively compute a plurality of subsequent weights.

Figure 2:
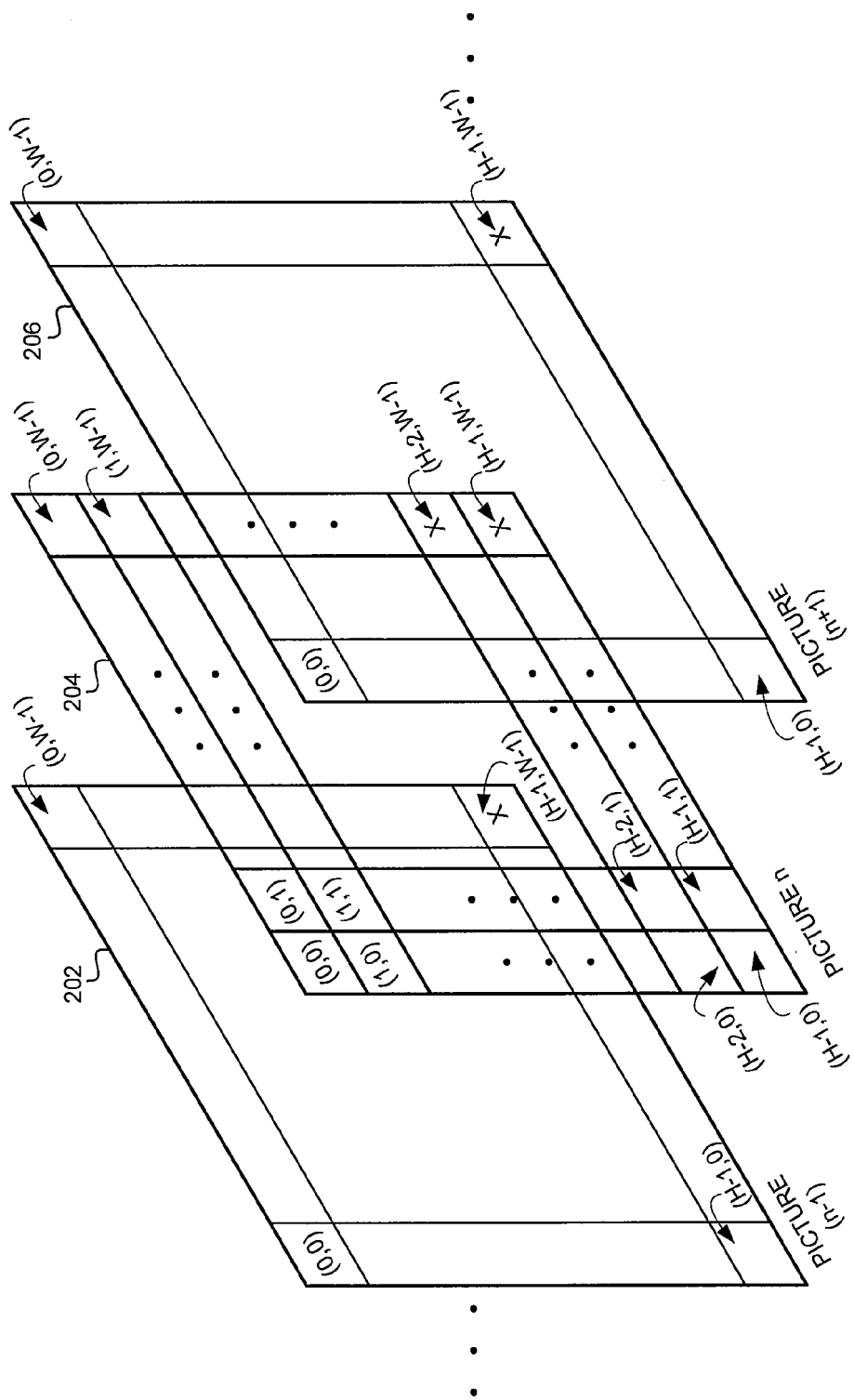
FIG. 2 is a diagram illustrating exemplary consecutive video pictures, in connection with an embodiment of the invention.

FIG. 2 is a diagram illustrating exemplary consecutive video frames, in connection with an embodiment of the invention. Referring to FIG. 2, there is shown a current video frame 204, a previous video frame 202, and a next video frame 206. The current video frame 204 or FRAME n may correspond to a current frame being processed by the video processing block 102 in FIG. 1. The previous video frame 202 or FRAME (n−1) may correspond to an immediately previous frame to the current video frame 204. The next video frame 206 or FRAME (n+1) may correspond to an immediately next frame to the current video frame 204. The previous video frame 202, the current video frame 204, and/or the next video frame 206 may be processed directly from the video input stream or after being buffered in the video processing block 102, for example. The current video frame 204, the previous video frame 202, and the next video frame 206 may comprise luma (Y) and/or chroma (Cb, Cr) information. In instances where video fields are utilized as frames, the previous video frame 202 may refer to the previous field of the same parity as the current video frame 204, and the next video frame 206 may refer to the next field of the same parity as the current frame 204. The previous, current and next video fields of the same parity may be referred to as consecutive video frames.

Pictures in consecutive video frames are said to be collocated when having the same frame location, that is, . . . , $P_{n-1}(x,y)$, $P_n(x,y)$, $P_{n+1}(x,y)$, . . . , where $P_{n-1}$ indicates a picture value in the previous video frame 202, $P_n$ indicates a picture value in the current video frame 204, $P_{n+1}$ indicates a picture value in the next video frame 206, and (x,y) is the common frame location between pictures. The frame location, (x,y) may be such that x=0, 1, . . . , W−1 and y=0, 1, . . . , H−1, where W is the frame width and H is the frame height, for example.

Operations of the video processing block 102 in FIG. 1 need not be limited to the use of exemplary consecutive video frames as illustrated in FIG. 2. For example, the video processing block 102 may perform filtering operations on consecutive video fields of the same parity, that is, on consecutive top fields or consecutive bottom fields. When performing noise reduction operations on consecutive video fields of the same parity, pictures in the video processing block 102 are said to be collocated when having the same frame location, that is, . . . , $P_{n-1}(x,y)$, $P_n(x,y)$, $P_{n+1}(x,y)$, . . . , where $P_{n-1}$ indicates a picture value in a previous video field, $P_n$ indicates a picture value in a current video field, $P_{n+1}$ indicates a picture value in a next video field, and (x,y) is the common frame location between pictures.

Figure 3A:
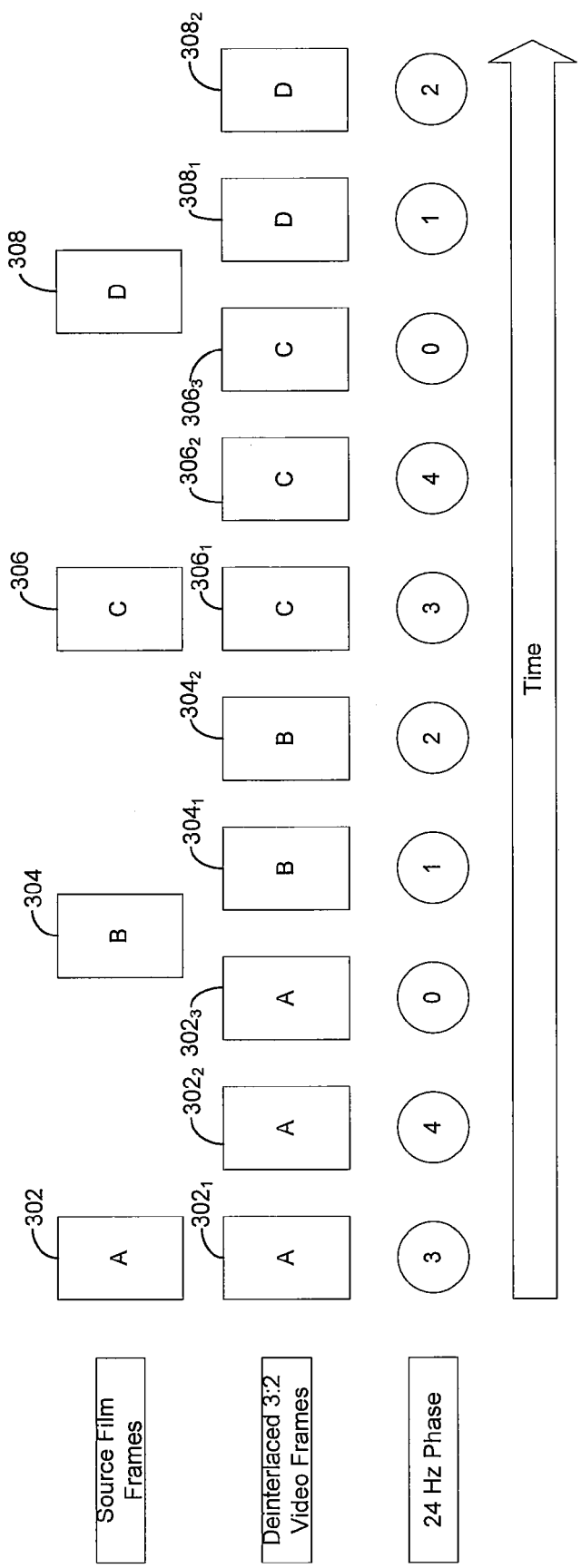
FIG. 3A is a diagram illustrating exemplary 3:2 pulldown that may be utilized for displaying 24 Hz video at 60 Hz, in accordance with an embodiment of the invention.

FIG. 3A is a diagram illustrating exemplary 3:2 pulldown that may be utilized for displaying 24 Hz video at 60 Hz, in accordance with an embodiment of the invention. Referring to FIG. 3A, there is shown a plurality of source film frames A 302, B, 304, C 306 and D 308 and a plurality of corresponding progressive scan 3:2 video frames A $302_1$ in phase 3, A $302_2$ in phase 4, A $302_3$ in phase 0, B $304_1$ in phase 1, B $304_2$ in phase 2, C $306_1$ in phase 3, C $306_2$ in phase 4, C $306_3$ in phase 0, D $308_1$ in phase 1 and D $308_2$ in phase 2. Notwithstanding, the words pixel and picture may be utilized interchangeably throughout this disclosure, without limiting the scope of the invention.

The video enabled device 100 may be enabled to determine a cadence, for example, 3:2 pulldown and a phase of the received progressive input frames A 302, B, 304, C 306 and D 308. The video enabled device 100 may be enabled to determine a difference between two or more consecutive received progressive input frames, for example, A 302 and B, 304. The video enabled device 100 may be enabled to compensate for 24 Hz video in a NTSC source.

Figure 3B:
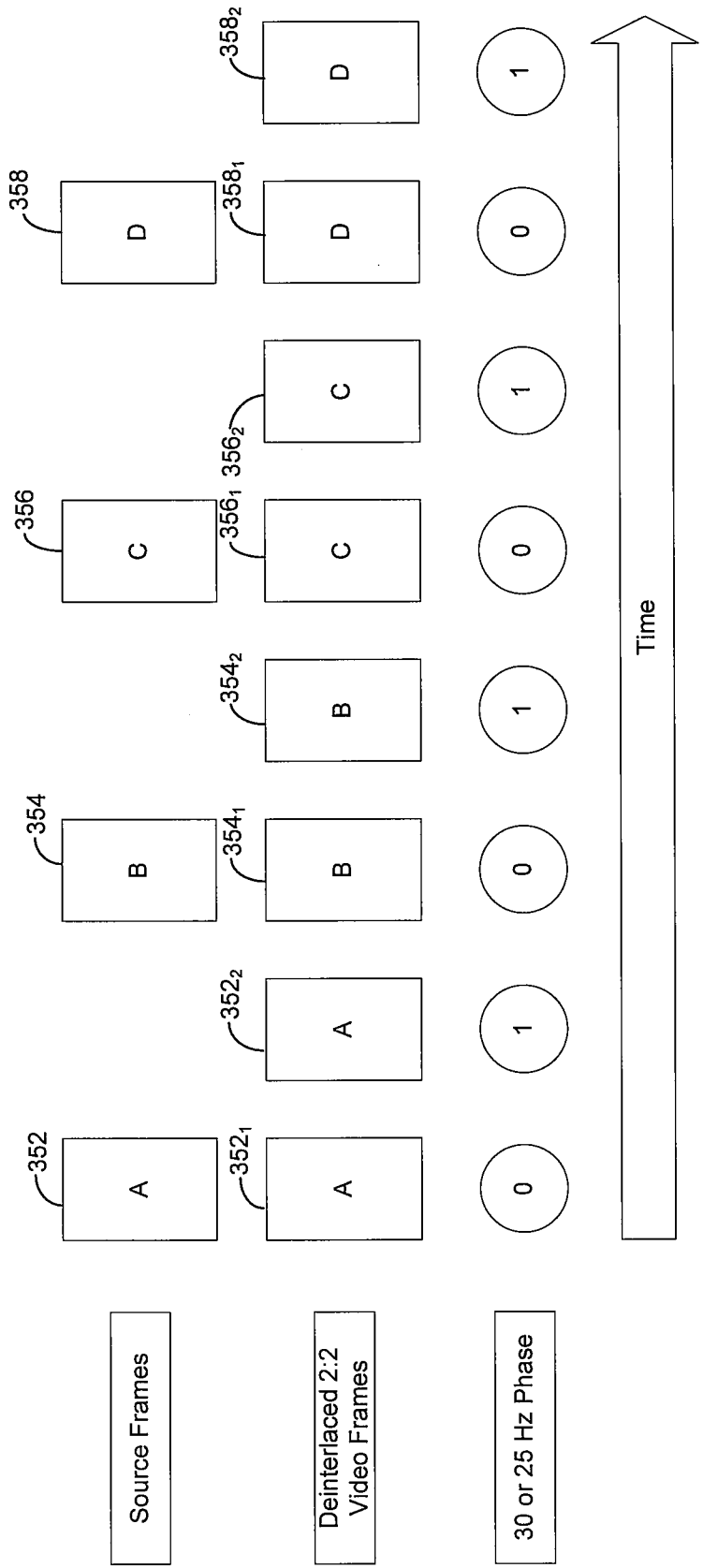
FIG. 3B is a diagram illustrating exemplary 2:2 pulldown that may be utilized for displaying 30 Hz video at 60 Hz or 25 Hz video at 50 Hz, in accordance with an embodiment of the invention.

FIG. 3B is a diagram illustrating exemplary 2:2 pulldown that may be utilized for displaying 30 Hz video at 60 Hz or 25 Hz video at 50 Hz, in accordance with an embodiment of the invention. Referring to FIG. 3B, there is shown a plurality of source frames A 352, B, 354, C 356 and D 358 and a plurality of corresponding progressive scan 2:2 video frames A $352_1$ in phase 0, A $352_2$ in phase 1, B $354_1$ in phase 0, B $354_2$ in phase 1, C $356_1$ in phase 0, C $356_2$ in phase 1, D $358_1$ in phase 0 and D $358_2$ in phase 1.

The video enabled device 100 may be enabled to determine a cadence, for example, 2:2 pulldown and a phase of the received progressive input frames A 352, B, 354, C 356 and D 358. The video enabled device 100 may be enabled to determine a difference between two or more consecutive received progressive input frames, for example, A 352 and B, 354. The video enabled device 100 may be enabled to compensate for 30 Hz video in a NTSC source or 25 Hz video in a PAL source.

Figure 4A:
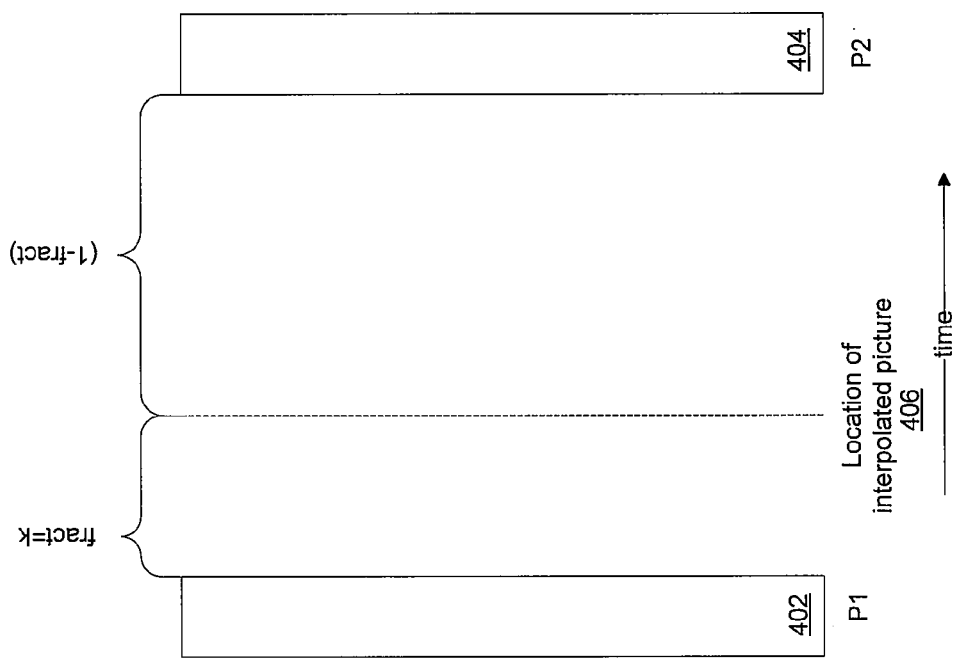
FIG. 4A is a block diagram illustrating insertion of an exemplary interpolated picture between two pictures, in accordance with an embodiment of the invention.

FIG. 4A is a block diagram illustrating insertion of an exemplary interpolated picture between two pictures, in accordance with an embodiment of the invention. Referring to FIG. 4A, there is shown a plurality of coded pictures, for example, P1 402 and P2 404 and the location of an interpolated picture 406. For example, the interpolated picture 406 may be inserted k time units from the coded picture P1 402.

Figure 4B:
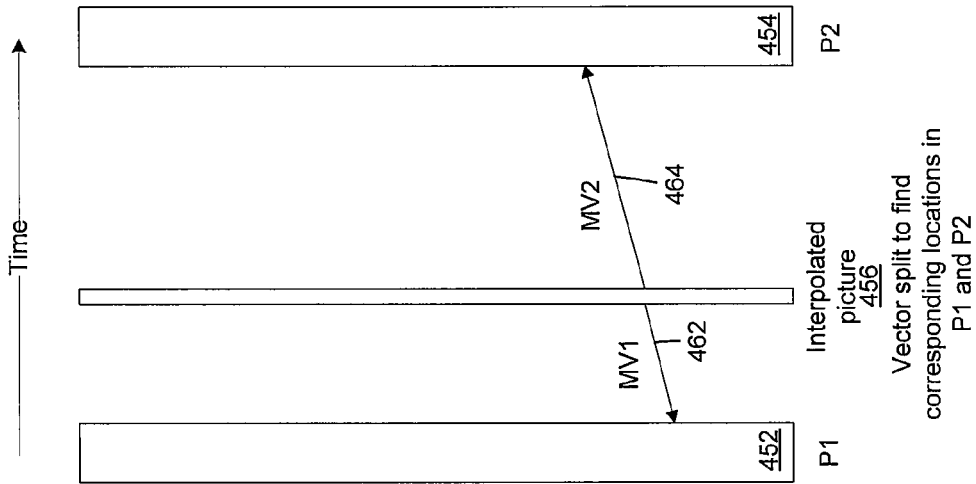
FIG. 4B is a block diagram illustrating exemplary motion vectors of an interpolated picture, in accordance with an embodiment of the invention.
Figure 4B:
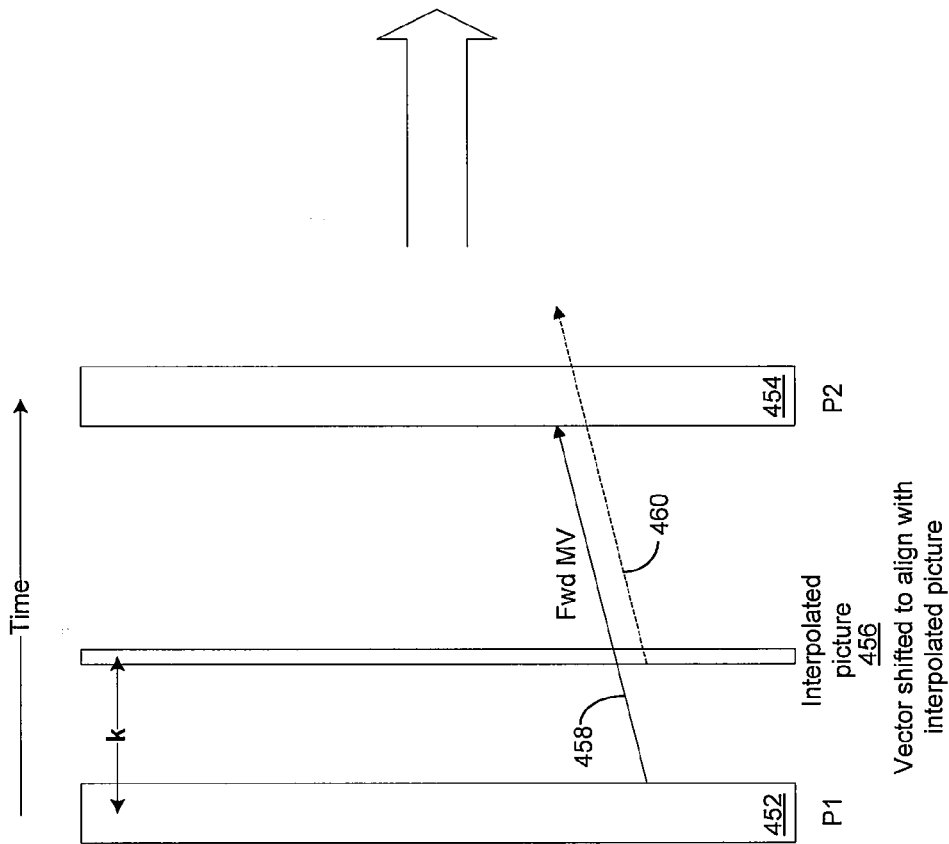

FIG. 4B is a block diagram illustrating exemplary motion vectors of an interpolated picture, in accordance with an embodiment of the invention. Referring to FIG. 4B, there is shown a plurality of coded pictures, for example, P1 452 and P2 454 and an interpolated picture 456. For example, the interpolated picture 456 may be inserted k time units from the coded picture P1 452.

A motion vector 458 may point from an area in the previous picture P1 452 to an area in the next picture P2 454, in such a way that the motion vector 458 may capture the motion that occurred between the two original pictures P1 452 and P2 454. The motion vector 460 may be a shifted version of motion vector 458. The motion vector 460 may be shifted to align with the interpolated picture 456.

The motion vector 460 may be split into two motion vectors, for example, the motion vectors MV1 462 and MV2 464. Each of the estimated motion vectors, for example, motion vector 460 may be split and scaled for motion compensated interpolation. The directions of the two scaled motion vectors, for example, the motion vectors MV1 462 and MV2 464 may be opposite to each other. The length of the scaled motion vector, for example, the motion vector MV1 462 may be proportional to the temporal difference between the interpolated picture 456 and the original picture P1 452. The length of the scaled motion vector, for example, the motion vector MV2 464 may be proportional to the temporal difference between the interpolated picture 456 and the original picture P2 454.

Figure 5:
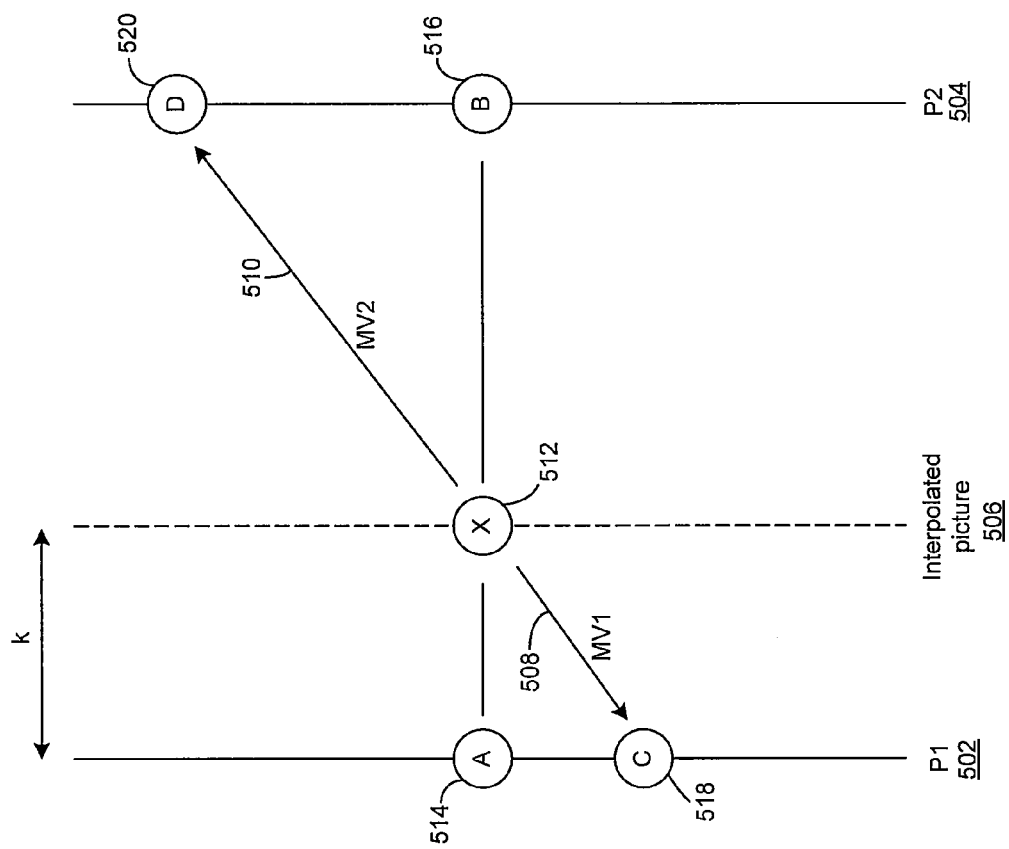
FIG. 5 is a block diagram illustrating exemplary motion-compensated forward and backward motion vectors corresponding to a block using adjacent pictures, in accordance with an embodiment of the invention.

FIG. 5 is a block diagram illustrating exemplary motion-compensated forward and backward motion vectors corresponding to a block using adjacent pictures, in accordance with an embodiment of the invention. Referring to FIG. 5, there is shown a plurality of pictures, for example, P1 502 and P2 504 and an interpolated picture 506.

The block motion estimation block 302 may be enabled to perform bi-directional motion estimation and select the motion vector with the least cost measurement for a given block or picture position (x,y). The selected forward motion vector 458 may be forward and backward projected onto the adjacent pictures P1 502 and P2 504 using a fraction value fract=k to generate a plurality of motion vectors in sub-pel resolution. For example, the motion vector MV2 510 may be generated according to the following equations:

$$mv2\_x=(1-k)*fwd\_mv\_x \text{ and } mv2\_y=(1-k)*fwd\_mv\_y,$$

where fwd_mv_x and fwd_mv_y may represent x and y components of the selected forward motion vector 458 respectively. Similarly, the motion vector MV1 508 may be generated according to the following equations:

$$mv1\_x=mv2\_x-fwd\_mv\_x \text{ and } mv1\_y=mv2\_y-fwd\_mv\_y.$$

The motion compensated interpolation block 308 may be enabled to perform motion compensation at each picture location. The current picture (x,y) may be indicated by picture X 512 in the interpolated picture 506. The picture A 514 may indicate a non-motion compensated picture from the previous picture P1 502. The picture B 516 may indicate a non-motion compensated picture from the next picture P2 504. The picture C 518 may indicate the motion compensated picture with sub-pixel resolution from the previous picture P1 502. The picture C 518 may be represented as follows:

$$PIX\_C=P1(x+mv1\_x, y+mv1\_y)$$

where mv1_x and mv1_y may indicate x and y components of MV1 508. The picture D 520 may indicate the motion compensated picture with sub-pixel resolution from the next picture P2 504. The picture D 520 may be represented as follows:

$$PIX\_D=P2(x+mv2\_x, y+mv2\_y)$$

where mv2_x and mv2_y may indicate x and y components of MV2 510.

The picture X 512 may be generated at the boundary regions using one of picture C 518 and picture D 520. If the forward motion vector 458 is selected, the picture D 520 may be used for predicting picture X 512. If the backward motion vector 408 is selected, the picture C 518 may be used for predicting picture X 512.

Figure 6A:
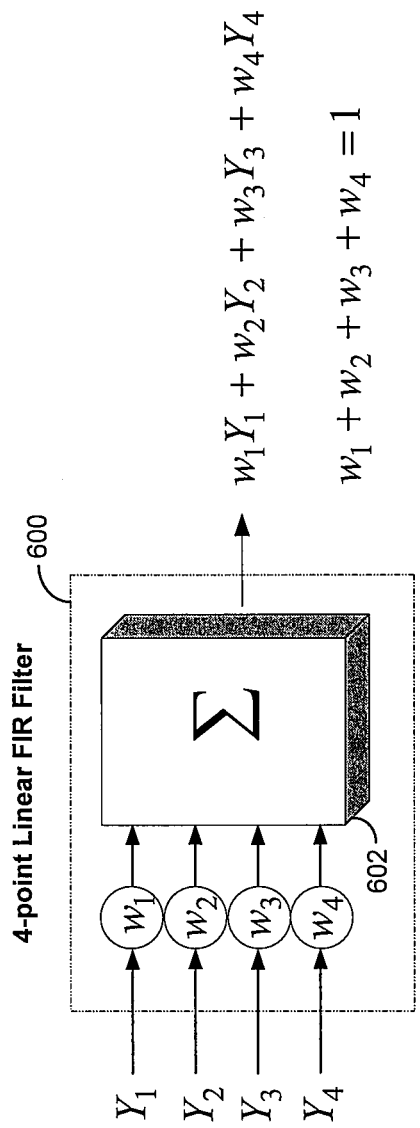
FIG. 6A is a block diagram of an exemplary linear FIR filter, in accordance with an embodiment of the invention.

FIG. 6A is a block diagram of an exemplary linear FIR filter, in accordance with an embodiment of the invention. Referring to FIG. 6A, there is shown a 4-point linear FIR filter 600. The 4-point linear FIR filter 600 may comprise a plurality of filter coefficients $w_1$, $w_2$, $w_3$ and $w_4$, and a summer 602.

The 4-point linear FIR filter 600 may be enabled to receive at least four picture inputs, $Y_1, Y_2, Y_3$ and $Y_4$. The plurality of filter coefficients $w_1, w_2, w_3$ and $w_4$ may be non-negative filter coefficients, $w_1 \geq 0$, $w_2 \geq 0$, $w_3 \geq 0$, $w_4 \geq 0$. The plurality of input pictures $Y_1, Y_2, Y_3$ and $Y_4$ may be scaled based on the plurality of filter coefficients $w_1, w_2, w_3$ and $w_4$, where $w_1+w_2+w_3+w_4=1$. The summer 602 may be enabled to sum the plurality of scaled input pictures and generate an output Y, where Y may be depicted according to the following equation:

$$Y=w_1Y_1+w_2Y_2+w_3Y_3+w_4Y_4 \quad (1)$$

Each of the plurality of received picture inputs, $Y_1, Y_2, Y_3$ and $Y_4$ may comprise three components (Y, Cr, Cb). Accordingly, each of the three components in each picture input may be scaled and averaged independently in the 4-point linear FIR filter 600.

Figure 6B:
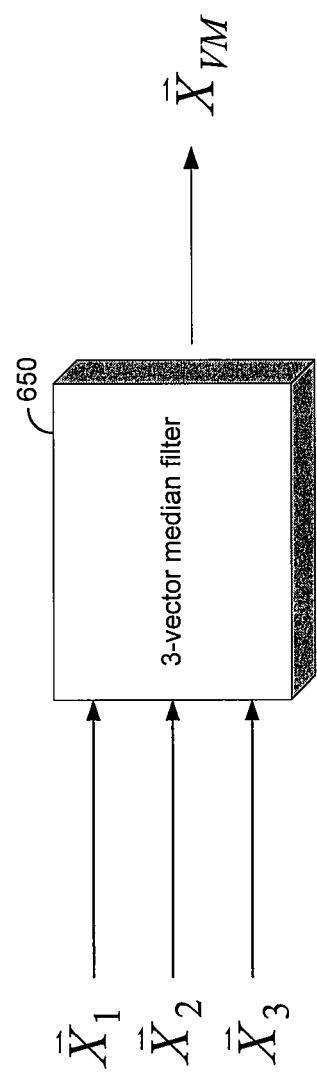
FIG. 6B is a block diagram of an exemplary vector median filter, in accordance with an embodiment of the invention.

FIG. 6B is a block diagram of an exemplary vector median filter, in accordance with an embodiment of the invention. Referring to FIG. 6B, there is shown a 3-point vector median filter 650. The 3-point vector median filter 650 may comprise a plurality of filter coefficients $w_1$, $w_2$, $w_3$ and $w_4$, and a summer 602.

The vector median block 650 may comprise suitable logic, circuitry and/or code that may be enabled to receive at least three input pictures, $\vec{X}_1, \vec{X}_2,$ and $\vec{X}_3$ and determine the median output $\vec{X}_{VM}$ of the received three input pictures, $\vec{X}_1$, $\vec{X}_2,$ and $\vec{X}_3$.

Each picture may comprise of Y, Cr, and Cb components. Accordingly, each of these pictures may be a 3-dimensional vector, for example. The vector median (VM) operation may be defined in vector space as the input vector which minimizes the "distance" to all other input vectors.

$$VM(\vec{X}_1, \vec{X}_2, \vec{X}_3) = \vec{X}_{VM}, \quad (2)$$

where $\sum_{i=1}^{3} \|\vec{X}_{VM} - \vec{X}_i\|_L \leq \sum_{i=1}^{3} \|\vec{X}_j - \vec{X}_i\|_L,$ for $j = 1, 2, 3;$ where $(\vec{X}_1, \vec{X}_2, \vec{X}_3) = ((Y_1, Cr_1, Cb_1), (Y_2, Cr_2, Cb_2), (Y_3, Cr_3, Cb_3)),$ $\vec{X}_{VM} = (Y_{VM}, Cr_{VM}, Cb_{VM})$ and L is the order of the "distance" measurement, for example, L=1 may imply absolute value, L=2 may imply squared Euclidian distance.

In accordance with an embodiment of the invention, each component may be processed independently by a scalar median filter, for example, a marginal median filter and combined to produce a filtered color image.

$$Y=\text{median}(Y_1,Y_2,Y_3) \; Cr=\text{median}(Cr_1,Cr_2,Cr_3)$$
$$Cb=\text{median}(Cb_1,Cb_2,Cb_3) \quad (3)$$

where median (a,b,c)=max(min(a,b),min(c,a)). On or more color artifacts may be generated when the chrominance components are processed independently. In order to avoid such color distortion, the Cr/Cb components may be processed together. However, it may not be necessary to keep the luminance and chrominance together. The following "partial" vector median (PVM) may be used as an alternative to either of the equations (2) and (3). For Y component, $$PVM(\vec{X}_1, \vec{X}_2, \vec{X}_3) = \text{median}(\vec{X}_1, \vec{X}_2, \vec{X}_3) \quad (4)$$

For Cr/Cb components:

$$PVM(\vec{X}_1, \vec{X}_2, \vec{X}_3) = \vec{X}_{VM}, \quad (5)$$

where $$\sum_{i=1}^{3} \|\vec{X}_{VM} - \vec{X}_i\|_L \le \sum_{i=1}^{3} \|\vec{X}_j - \vec{X}_i\|_L,$$

for $$j = 1, 2, 3 \ldots$$

The luminance may be determined independently with a one-dimensional median filter, and the chrominance may be determined jointly using a two-dimensional vector median, for example.

Figure 7:
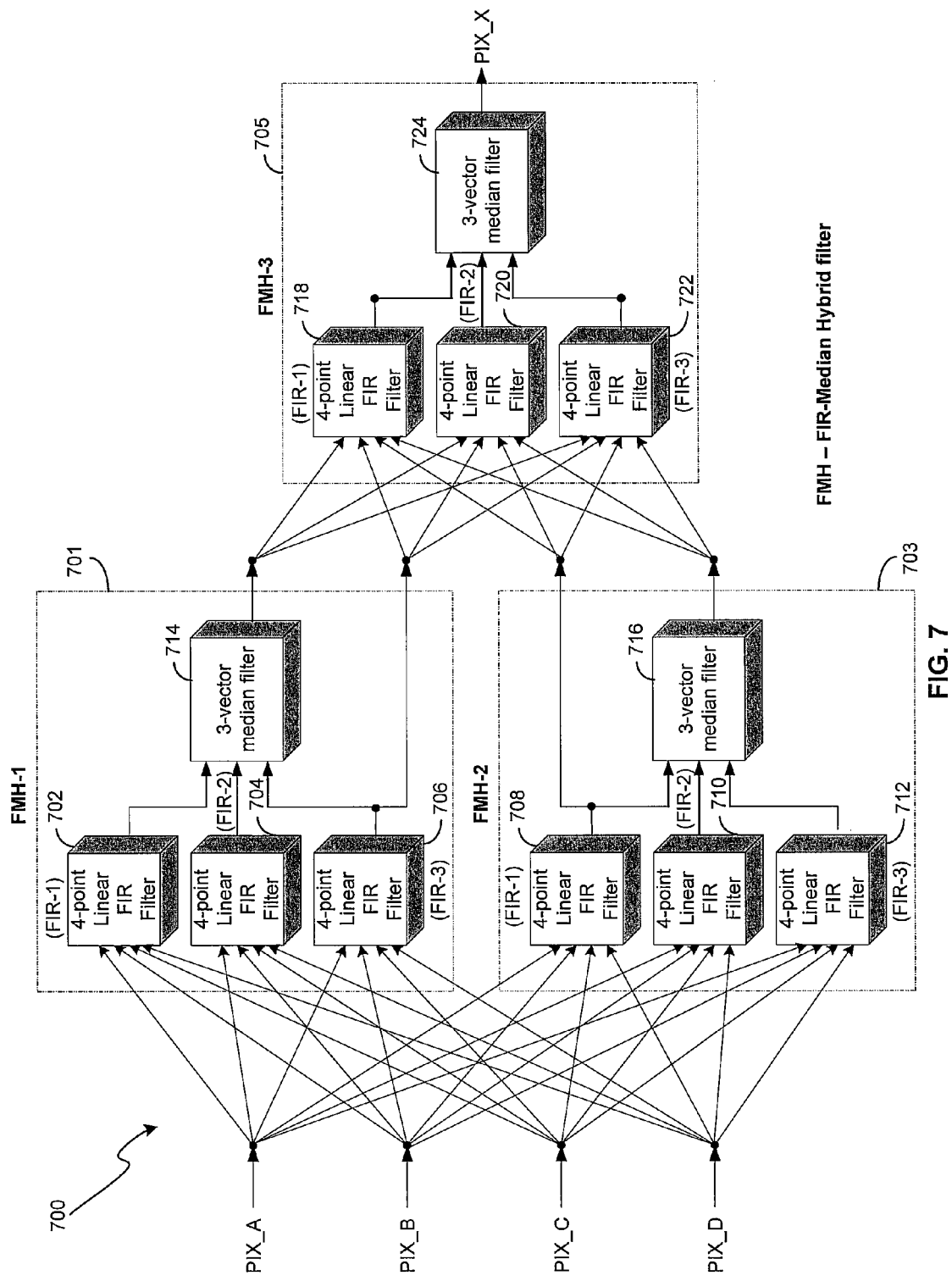
FIG. 7 is a block diagram of an exemplary adaptive temporal interpolation filtering system, in accordance with an embodiment of the invention.

FIG. 7 is a block diagram of an exemplary adaptive temporal interpolation filtering system, in accordance with an embodiment of the invention. Referring to FIG. 7, there is shown a two-stage adaptive temporal interpolation filtering system 700. The two-stage adaptive temporal interpolation filtering system 700 may comprise two stages of FIR median hybrid filters (FMH). The first stage may comprise two FMH filters, for example, FMH-1 701 and FMH-2 703. The second stage may comprise one FMH filter, for example, FMH-3 705. The FMH-1 701 may comprise a plurality of linear FIR filters, FIR-1 702, FIR-2 704 and FIR-3 706, and a vector median filter 714. The FMH-2 703 may comprise a plurality of linear FIR filters, FIR-1 708, FIR-2 710 and FIR-3 712, and a vector median filter 716. The FMH-3 705 may comprise a plurality of linear FIR filters, FIR-1 718, FIR-2 720 and FIR-3 722, and a vector median filter 724.

In accordance with an embodiment of the invention, each of the plurality of linear FIR filters may be 4-point linear FIR filters. Each of the 4-point linear FIR filters, for example, FIR-1 702, FIR-2 704, FIR-3 706, FIR-1 708, FIR-2 710 and FIR-3 712 may comprise suitable logic, circuitry and/or code that may be enabled to receive at least four inputs, such as, the picture A 514, the picture B 516, the picture C 518 and the picture D 520 and generate an output to the corresponding vector median filter in the FMH. For example, the FIR-1 702 may be enabled to receive at least four inputs, such as, the picture A 514, the picture B 516, the picture C 518 and the picture D 520 and generate an output to the vector median filter 714. In accordance with another embodiment of the invention, one of the linear FIR filters from FMH-1, for example, the FIR-3 706 and one of the linear FIR filters from FMH-2, for example, the FIR-1 708 may be enabled to receive at least four inputs, such as, the picture A 514, the picture B 516, the picture C 518 and the picture D 520 and generate outputs to the corresponding vector median filter in the FMH and FMH-3 705. The structure of a 4-point linear FIR filter may be substantially as described with respect to FIG. 6A.

Each of the plurality of vector median filters, for example, vector median filter 714, 716 and 724 may comprise suitable logic, circuitry and/or code that may be enabled to receive at least three inputs, such as, $\vec{X}_1, \vec{X}_2$, and $\vec{X}_3$ and determine the median output $\vec{X}_{VM}$. For example, the vector median filter 714 may be enabled to receive an input from each of the 4-point FIR linear filters, the FIR-1 702, the FIR-2 704 and the FIR-3 706 and generate a vector median output to FMH-3 705. The plurality of vector median filters, for example, the vector median filters 714, 716 and 724 may be 3-point vector median filters and comprise a plurality of filter coefficients $w_1, w_2, w_3$ and $w_4$, and a summer. The structure of a 3-point vector median filter may be substantially as described with respect to FIG. 6B.

In the second stage of the adaptive temporal interpolation filtering system 700, each 4-point linear FIR filter, for example, the FIR-1 718, the FIR-2 720 and the FIR-3 722 may comprise suitable logic, circuitry and/or code that may be enabled to receive at least four inputs, such as, outputs of vector median filters 714 and 716, and outputs of the linear FIR filters, FIR-3 706 and FIR-1 708 and generate an output to the vector median filter 724 in FMH-3 705.

The vector median filter 724 may comprise suitable logic, circuitry and/or code that may be enabled to receive at least three inputs, such as, $\vec{X}_1, \vec{X}_2$, and $\vec{X}_3$ and determine the median output $\vec{X}_{VM}$. For example, the vector median filter 724 may be enabled to receive an input from each of the 4-point FIR linear filters, FIR-1 718, FIR-2 720 and FIR-3 722 and generate a desired vector median output, such as picture X, PIX_X.

In accordance with an embodiment of the invention, for each linear FIR filter in each FMH filter, the coefficients $w_1, w_2, w_3$ and $w_4$ may be programmable and may be utilized to adaptively tune the overall filter operation. The coefficient values of $w_1, w_2$, and $w_4$ are between 0 and 1. Accordingly, the two-stage adaptive temporal interpolation filtering system 700 may be configured based on a plurality of filtering modes. For example, Table 1 illustrates a static configuration of the two-stage adaptive temporal interpolation filtering system 700, which may be referred to as the stationary linear filtering path.

TABLE 1

| FIR-1 | | | | FIR-2 | | | | FIR-3 | | | |
|---|---|---|---|---|---|---|---|---|---|---|---|
| w1 | w2 | w3 | w4 | w1 | w2 | w3 | w4 | w1 | w2 | w3 | w4 |
| FMH-1 | | | | | | | | | | | |
| x | x | x | x | x | x | x | x | 1-k | k | 0 | 0 |
| FMH-2 | | | | | | | | | | | |
| 1-k | k | 0 | 0 | x | x | x | x | x | x | x | x |
| FMH-3 | | | | | | | | | | | |
| 0 | 1 | 0 | 0 | x | x | x | x | 0 | 0 | 1 | 0 |

Table 2 illustrates another static configuration of the two-stage adaptive temporal interpolation filtering system 700, which may be referred to as the motion linear filtering path, for example.

TABLE 2

| FIR-1 | | | | FIR-2 | | | | FIR-3 | | | |
|---|---|---|---|---|---|---|---|---|---|---|---|
| w1 | w2 | w3 | w4 | w1 | w2 | w3 | w4 | w1 | w2 | w3 | w4 |
| FMH-1 | | | | | | | | | | | |
| x | x | x | x | x | x | x | x | 0 | 0 | 1-k | k |
| FMH-2 | | | | | | | | | | | |
| 0 | 0 | 1-k | k | x | x | x | x | x | x | x | x |
| FMH-3 | | | | | | | | | | | |
| 0 | 1 | 0 | 0 | x | x | x | x | 0 | 0 | 1 | 0 |

Table 3 illustrates another static configuration of the two-stage adaptive temporal interpolation filtering system 700, which may be referred to as the stationary FMH filtering path, for example.

TABLE 3

| FIR-1 | | | | FIR-2 | | | | FIR-3 | | | |
|---|---|---|---|---|---|---|---|---|---|---|---|
| w1 | w2 | w3 | w4 | w1 | w2 | w3 | w4 | w1 | w2 | w3 | w4 |
| FMH-1 | | | | | | | | | | | |
| 1 | 0 | 0 | 0 | 0 | 1 | 0 | 0 | 0 | 0 | 1-k | k |
| FMH-2 | | | | | | | | | | | |
| 1 | 0 | 0 | 0 | 0 | 1 | 0 | 0 | 0 | 0 | 1-k | k |
| FMH-3 | | | | | | | | | | | |
| 1 | 0 | 0 | 0 | x | x | x | x | 0 | 0 | 0 | 1 |

The FMH-3 filter 705 in Table 3 may be enabled to check for consistency between the two non-motion compensated pictures, PIX_A and PIX_B. If no motion has occurred at this location, PIX_A and PIX_B may be nearly identical, and the output may be a stationary picture. If motion has occurred, PIX_A and PIX_B may likely be quite different relative to the motion compensated pictures. Accordingly, the output may be either the motion compensated result or the stationary picture which is closest to the motion compensated result.

Table 4 illustrates another static configuration of the two-stage adaptive temporal interpolation filtering system 700, which may be referred to as the motion FMH filtering path, for example.

TABLE 4

| FIR-1 | | | | FIR-2 | | | | FIR-3 | | | |
|---|---|---|---|---|---|---|---|---|---|---|---|
| w1 | w2 | w3 | w4 | w1 | w2 | w3 | w4 | w1 | w2 | w3 | w4 |
| FMH-1 | | | | | | | | | | | |
| 1-k | k | 0 | 0 | 0 | 0 | 1 | 0 | 0 | 0 | 0 | 1 |
| FMH-2 | | | | | | | | | | | |
| 1-k | k | 0 | 0 | 0 | 0 | 1 | 0 | 0 | 0 | 0 | 1 |
| FMH-3 | | | | | | | | | | | |
| 1 | 0 | 0 | 0 | x | x | x | x | 0 | 0 | 0 | 1 |

The FMH-3 filter 705 in Table 4 may be enabled to check the consistency between the two motion-compensated pictures, PIX_C and PIX_D. If the motion estimation for this block has accurately determined the motion of the current picture, PIX_C and PIX_D may be close to one another. Therefore, the output may be one of the motion compensated pictures. If motion estimation has failed, PIX_C and PIX_D may likely be quite different relative to the stationary average.

Table 5 illustrates another static configuration of the two-stage adaptive temporal interpolation filtering system 700, which may be referred to as the stationary/motion linear blend filtering path, for example.

TABLE 5

| FIR-1 | | | | FIR-2 | | | | FIR-3 | | | |
|---|---|---|---|---|---|---|---|---|---|---|---|
| w1 | w2 | w3 | w4 | w1 | w2 | w3 | w4 | w1 | w2 | w3 | w4 |
| FMH-1 | | | | | | | | | | | |
| x | x | x | x | x | x | x | x | 1-k | k | 0 | 0 |
| FMH-2 | | | | | | | | | | | |
| 0 | 0 | 1-k | k | x | x | x | x | x | x | x | x |
| FMH-3 | | | | | | | | | | | |
| 0 | 1-p | p | 0 | 0 | 1-p | p | 0 | 0 | 1-p | p | 0 |

The weighted average blends together the motion compensated average with the stationary average. This blending may be controlled by the programmable coefficient p in FMH-3 of Table 5. The coefficient p may be utilized to bias the final vector median filter 724 either towards motion-compensated filtering or towards stationary filtering. The coefficient p may be set to a particular value by a user or may be programmed on a frame-by-frame or block-by-block basis. For example, the coefficient p may be programmed based on a measure of motion vector consistency.

In accordance with an embodiment of the invention, the final vector median filter 724 may be enabled to perform a vector median operation on the stationary FMH filtering output, the motion FMH filtering output, and the stationary/motion linear blend output, for example. The final vector median filter 724 may be enabled to remove outlying pictures by finding an input picture similar to the other two inputs. The stationary/motion linear blend input may be tuned with the adjustable parameter p in FMH-3 705 of Table 5 to bias towards either stationary or motion-compensated filtering, as shown in Table 6.

Table 6 illustrates an exemplary static configuration of the two-stage adaptive temporal interpolation filtering system 700, which may be referred to as the stationary/motion linear blend filtering path, for example.

TABLE 6

| FIR-1 | | | | FIR-2 | | | | FIR-3 | | | |
|---|---|---|---|---|---|---|---|---|---|---|---|
| w1 | w2 | w3 | w4 | w1 | w2 | w3 | w4 | w1 | w2 | w3 | w4 |
| FMH-1 | | | | | | | | | | | |
| 0 | 0 | 1 | 0 | 0 | 0 | 0 | 1 | 1-k | k | 0 | 0 |
| FMH-2 | | | | | | | | | | | |
| 0 | 0 | 1-k | k | 1 | 0 | 0 | 0 | 0 | 1 | 0 | 0 |
| FMH-3 | | | | | | | | | | | |
| 1 | 0 | 0 | 0 | 0 | 1-p | p | 0 | 0 | 0 | 0 | 1 |

Notwithstanding, the invention may not be so limited, and other suitable static configurations may be utilized, without limiting the scope of the invention.

Figure 8A:
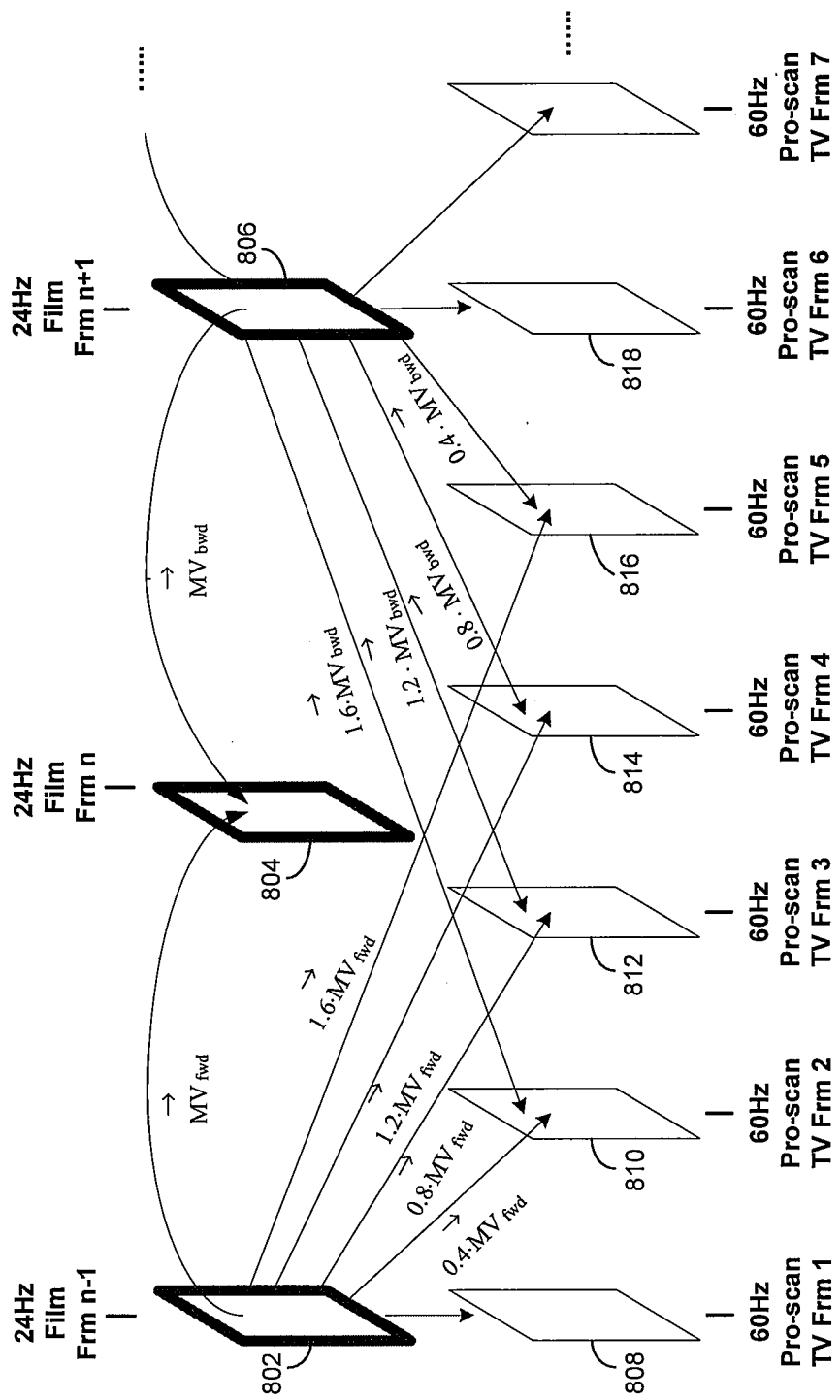
FIG. 8A is a block diagram illustrating exemplary motion interpolation for 24 Hz to 60 Hz upconversion with 3-frame motion estimation, in accordance with an embodiment of the invention.

FIG. 8A is a block diagram illustrating exemplary motion interpolation for 24 Hz to 60 Hz upconversion with 3-frame motion estimation, in accordance with an embodiment of the invention. Referring to FIG. 8A, there is shown a plurality of source film frames, frame n−1 802, frame n 804 and frame n+1 806 and a corresponding plurality of progressive scan 3:2 video frames, frame 1 808, frame 2 810, frame 3 812, frame 4 814, frame 5 816, and frame 6 818. Notwithstanding, the words frame and picture may be utilized interchangeably throughout this disclosure, without limiting the scope of the invention.

Each of the interpolated frames may be represented as a scaled forward motion vector $\vec{MV}_{fwd}$ or a scaled backward motion vector $\vec{MV}_{bwd}$, where the forward and backward motion vectors $\vec{MV}_{fwd}$ and $\vec{MV}_{bwd}$ respectively represent frame n 804. For example, the frame 2 810 may be represented as $0.4*\vec{MV}_{fwd}$ or $1.6*\vec{MV}_{bwd}$, the frame 3 812 may be represented as $0.8*\vec{MV}_{fwd}$ or $1.2*\vec{MV}_{bwd}$, the frame 4 814 may be represented as $1.2*\vec{MV}_{fwd}$ or $0.8*\vec{MV}_{bwd}$, and the frame 5 816 may be represented as $1.6*\vec{MV}_{fwd}$ or $0.4*\vec{MV}_{bwd}$.

Figure 8B:
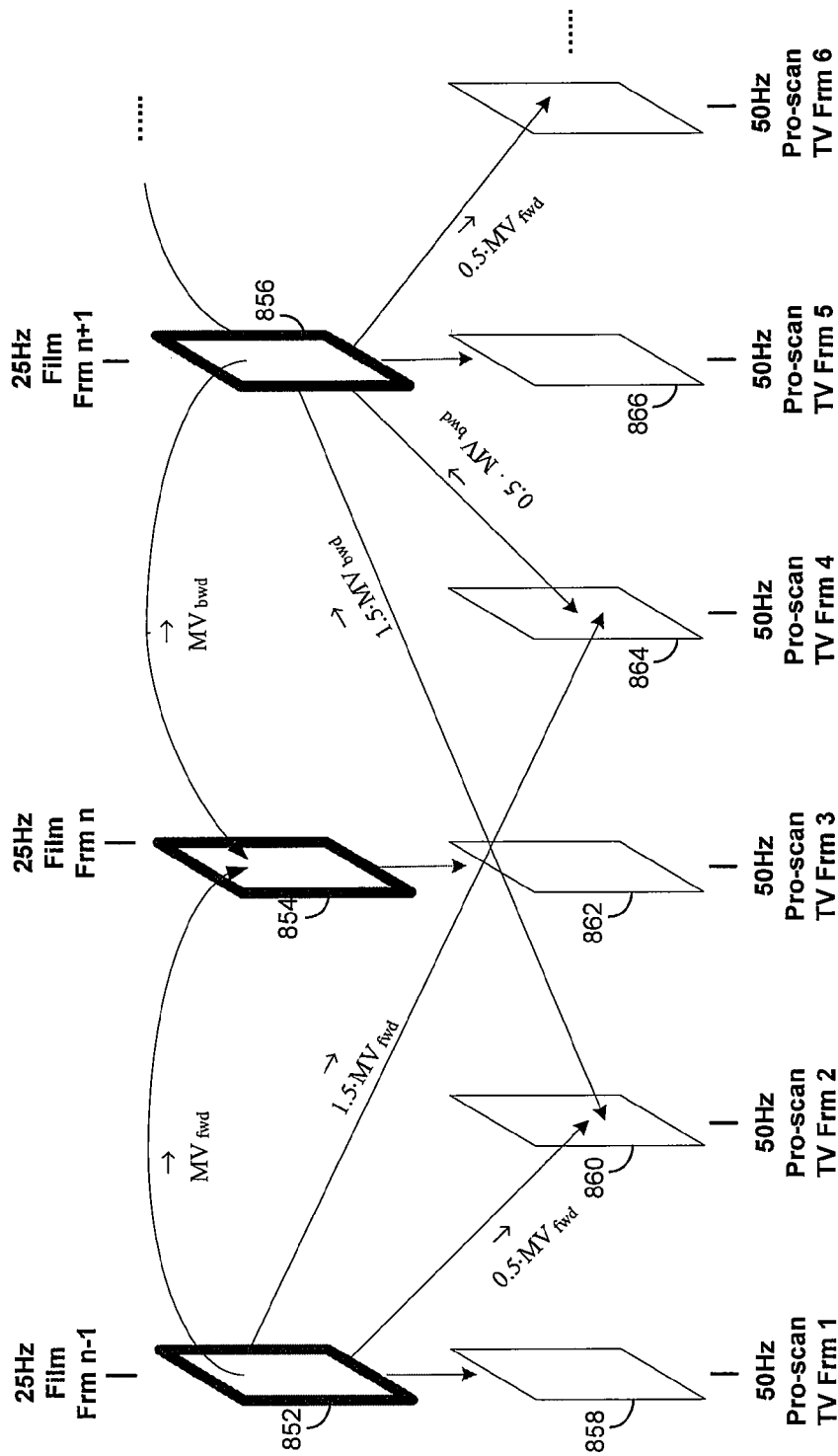
FIG. 8B is a block diagram illustrating exemplary motion interpolation for 25 Hz to 50 Hz upconversion with 3-frame motion estimation, in accordance with an embodiment of the invention.

FIG. 8B is a block diagram illustrating exemplary motion interpolation for 25 Hz to 50 Hz upconversion with 3-frame motion estimation, in accordance with an embodiment of the invention. Referring to FIG. 8B, there is shown a plurality of source film frames, frame n−1 852, frame n 854 and frame n+1 856 and a corresponding plurality of progressive scan 2:2 video frames, frame 1 858, frame 2 860, frame 3 862, frame 4 864, and frame 5 866.

Each of the interpolated frames may be represented as a scaled forward motion vector $\vec{MV}_{fwd}$ or a scaled backward motion vector $\vec{MV}_{bwd}$, where the forward and backward motion vectors $\vec{MV}_{fwd}$ and $\vec{MV}_{bwd}$ respectively represent frame n 854. For example, the frame 2 860 may be represented as $0.5*\vec{MV}_{fwd}$ or $1.5*\vec{MV}_{bwd}$ and frame 4 864 may be represented as $1.5*\vec{MV}_{fwd}$ or $0.5*\vec{MV}_{bwd}$.

Figure 9:
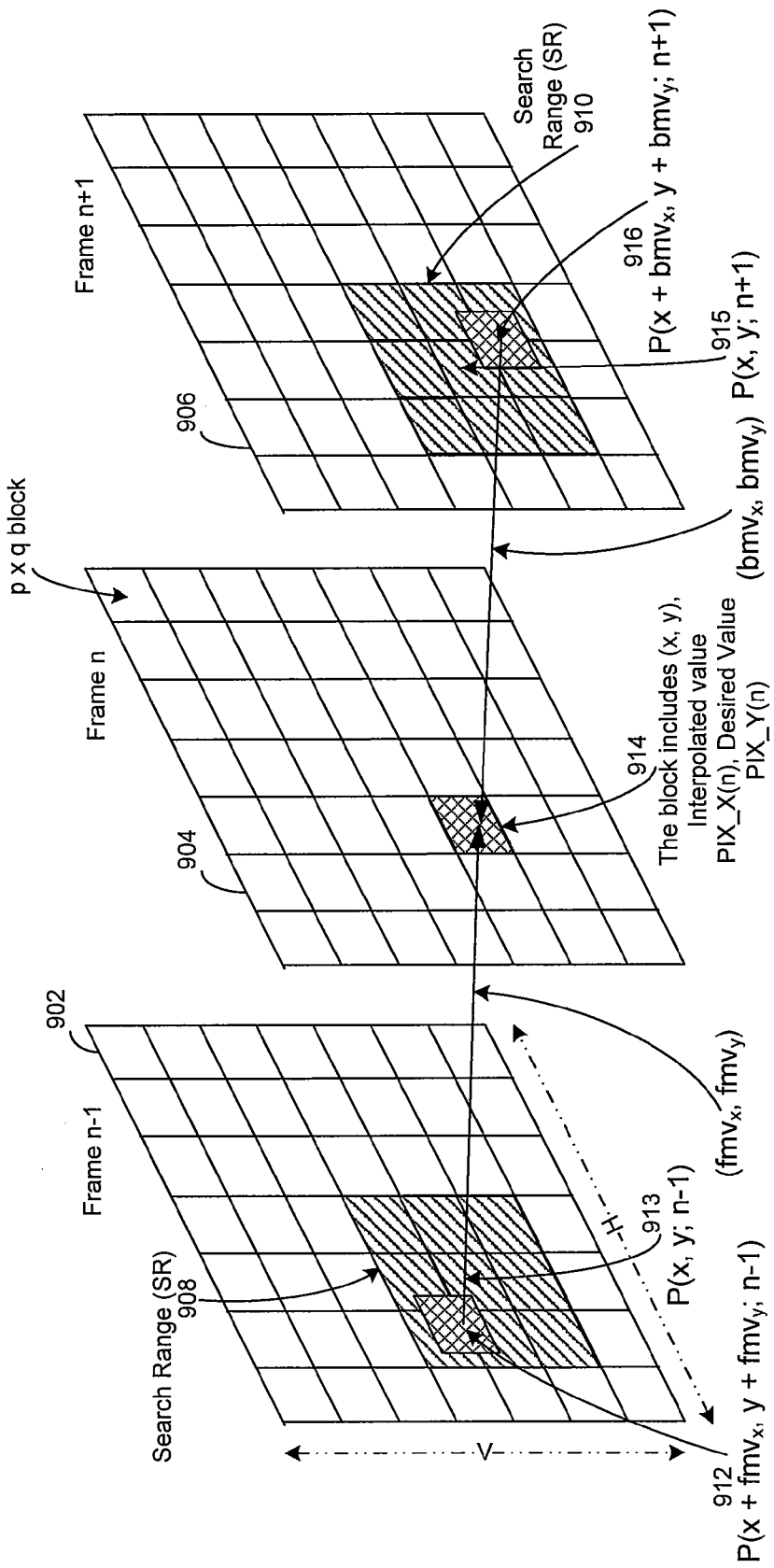
FIG. 9 is a block diagram illustrating exemplary motion estimation and compensation for a 3-frame architecture, in accordance with an embodiment of the invention.

FIG. 9 is a block diagram illustrating exemplary motion estimation and compensation for a 3-frame architecture, in accordance with an embodiment of the invention. Referring to FIG. 9, there is shown a previous frame, frame n−1 902, a current frame, frame n 904, and a next frame, frame n+1 906.

In accordance with an embodiment of the invention, an iterative algorithm, such as a least squares algorithm may be utilized to determine a interpolated picture PIX_X(n) estimated at frame n 904 for a block (x, y). The block 914 in frame n 904 may also comprise an interpolated picture PIX_X(n) and a desired picture PIX_Y(n). The block 912 in the search range 908 of frame n−1 902 may be utilized to generate the interpolated picture PIX_X(n) of block 914 based on P(x+fmv$_x$, y+fmv$_y$; n−1), where (fmv$_x$, fmv$_y$) represents the forward motion vector of frame n 904. The block 916 in the search range 910 in frame n+1 906 may be utilized to generate the interpolated picture PIX_X(n) of the block 914 in the frame n 904 based on P(x+bmv$_x$, y+bmv$_y$; n+1), where (bmv$_x$, bmv$_y$) represents the backward motion vector of the frame n 904.

Figure 10:
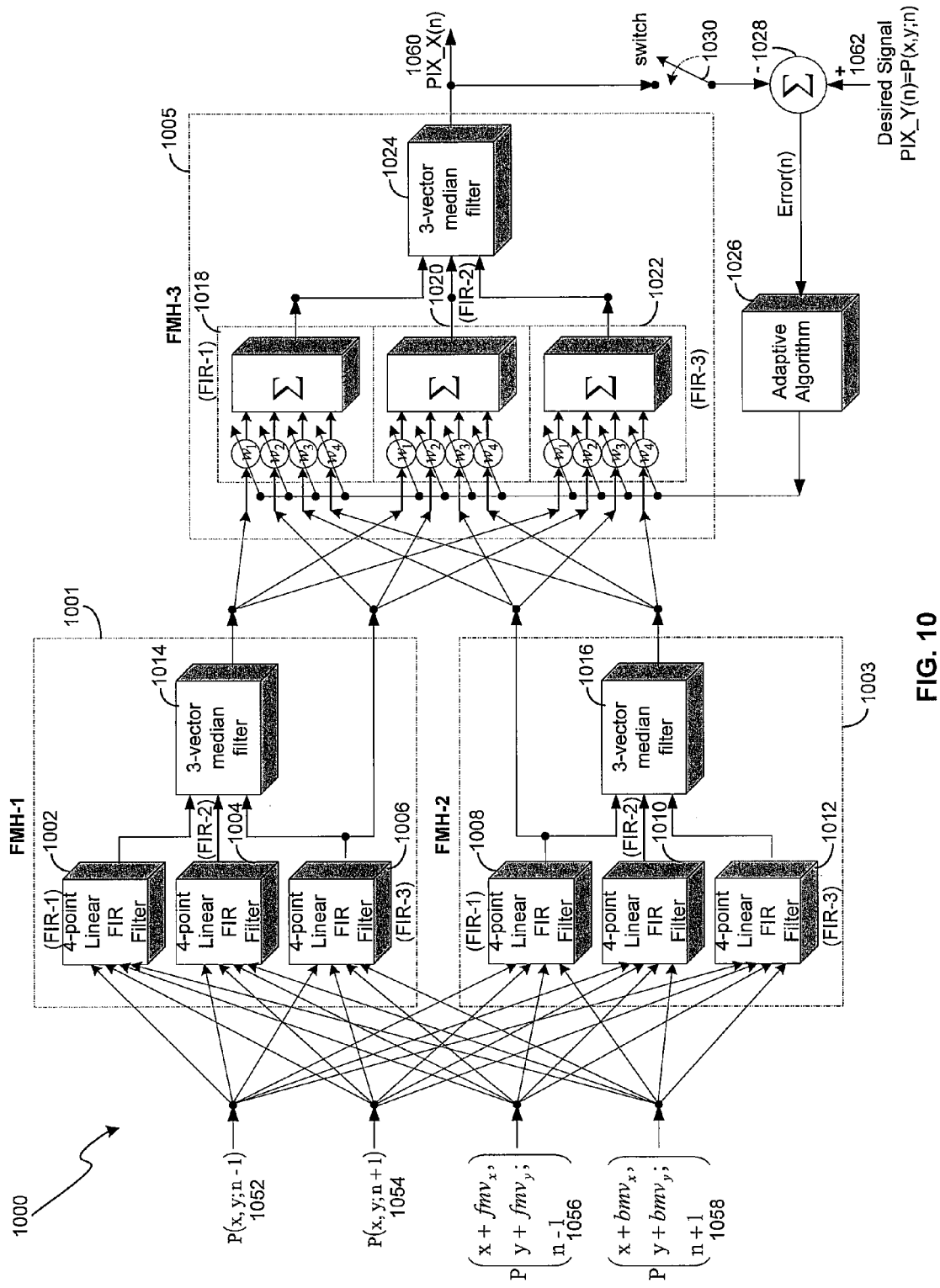
FIG. 10 is a block diagram of an exemplary adaptive temporal interpolation filtering system with 3-frame motion estimation, in accordance with an embodiment of the invention.

FIG. 10 is a block diagram of an exemplary adaptive temporal interpolation filtering system with 3-frame motion estimation, in accordance with an embodiment of the invention. Referring to FIG. 10, there is shown a two-stage adaptive temporal interpolation filtering system 1000. The two-stage adaptive temporal interpolation filtering system 1000 may comprise two stages of FIR median hybrid filters (FMH). The first stage may comprise two FMH filters, for example, FMH-1 1001 and FMH-2 1003. The second stage may comprise one FMH filter, for example, FMH-3 1005. The FMH-1 1001 may comprise a plurality of linear FIR filters, for example, FIR-1 1002, FIR-2 1004 and FIR-3 1006, and a vector median filter 1014. The FMH-2 1003 may comprise a plurality of linear FIR filters, FIR-1 1008, FIR-2 1010 and FIR-3 1012, and a vector median filter 1016. The FMH-3 1005 may comprise a plurality of linear FIR filters, FIR-1 1018, FIR-2 1020 and FIR-3 1022, and a vector median filter 1024.

In accordance with an embodiment of the invention, each of the plurality of linear FIR filters, for example, the FIR-1 1002, the FIR-2 1004, the FIR-3 1006, the FIR-1 1008, the FIR-2 1010 and the FIR-3 1012 may be 4-point linear FIR filters. Each of the plurality of linear filters, for example, the FIR-1 1002, the FIR-2 1004, the FIR-3 1006, the FIR-1 1008, the FIR-2 1010 and the FIR-3 1012 may be enabled to receive four or more input pictures. For example, the FIR-1 1002 may be enabled to receive at least four inputs, such as, the picture A 1052 [P(x, y; n−1)], the picture B 1054 [P(x, y; n+1)], the picture C 1056 [P(x+fmv$_x$, y+fmv$_y$; n−1)], and the picture D 1058 [P(x+bmv$_x$, y+bmv$_y$; n+1)] and generate an output to the vector median filter 1014. Accordingly, two or more of the input pictures may be motion-compensated input pictures, for example, the picture C 1056 [P(x+fmv$_x$, y+fmv$_y$; n−1)] and the picture D 1058 [P(x+bmv$_x$, y+bmv$_y$; n+1)] and two or more of the input pictures may be non-motion compensated input pictures, for example, the picture A 1052 [P(x, y; n−1)] and the picture B 1054 [P(x, y; n+1)]. The structure of a 4-point linear FIR filter may be substantially as described with respect to FIG. 6A.

In accordance with an embodiment of the invention, each of the plurality of vector median filters, for example, 1014, 1016 and 1024 may be 3-point vector median filters. Each of the plurality of vector median filters, for example, vector median filter 1014, 1016 and 1024 may comprise suitable logic, circuitry and/or code that may be enabled to receive at least three inputs, such as, $\vec{X}_1, \vec{X}_2$, and $\vec{X}_3$ and determine the median output $\vec{X}_{VM}$. For example, the vector median filter 1014 may be enabled to receive an input from each of the 4-point FIR linear filters, the FIR-1 1002, the FIR-2 1004 and the FIR-3 1006 and generate a vector median output to FMH-3 1005. The plurality of vector median filters, for example, the vector median filters 1014, 1016 and 1024 may be 3-point vector median filters and may comprise a plurality of filter coefficients w$_1$, w$_2$, w$_3$ and w$_4$, and a summer. The structure of a 3-point vector median filter may be substantially as described with respect to FIG. 6B.

The plurality of linear filters, for example, FIR-1 1002, FIR-2 1004, FIR-3 1006, FIR-1 1008, FIR-2 1010 and FIR-3 1012 may be enabled to generate a plurality of linear filtered output pictures based on filtering the four or more input pictures, for example, picture A 1052, picture B 1054, picture C 1056, and picture D 1058. The plurality of vector median filters, for example, 1014 and 1016 may be enabled to vector median filter each of the generated plurality of linear filtered output pictures to generate a plurality of filtered input pictures. In accordance with an embodiment of the invention, each of the FMH filters, FMH-1 1001 and FMH-2 1003 may be statically configured.

In the second stage of the adaptive temporal interpolation filtering system 1000, each 4-point linear FIR filter, for example, FIR-1 1018, FIR-2 1020 and FIR-3 1022 may comprise suitable logic, circuitry and/or code that may be enabled to receive at least four inputs, such as, outputs of the vector median filters 1014 and 1016, and outputs of the linear FIR filters FIR-3 1006 and FIR-1 1008 and generate an output to the vector median filter 1024 in FMH-3 1005.

The vector median filter 1024 may comprise suitable logic, circuitry and/or code that may be enabled to receive at least three inputs, such as, $\vec{X}_1, \vec{X}_2,$ and $\vec{X}_3$ and determine the median output $\vec{X}_{VM}$. For example, the vector median filter 1024 may be enabled to receive an input from each of the 4-point FIR linear filters, FIR-1 1018, FIR-2 1020 and FIR-3 1022 and generate a motion compensated output picture, PIX_X(n) 1060.

The second stage may comprise one or more FMH filters, for example, FMH-3 1005. The FMH-3 1005 may comprise a plurality of linear filters, for example, FIR-1 1018, FIR-2 1020 and FIR-3 1022 and a vector median filter 1024. The FMH-3 1005 may be enabled to receive four or more filtered input pictures at each of three or more of the plurality of linear filters, for example, FIR-1 1018, FIR-2 1020 and FIR-3 1022. Each of the plurality of linear filters, for example, FIR-1 1018, FIR-2 1020 and FIR-3 1022 in FMH-3 1005 may be enabled to generate a plurality of linear filtered output pictures based on filtering the four or more filtered input pictures. The vector median filter 1024 may be enabled to vector median filter each of the generated plurality of linear filtered output pictures to generate one or more motion compensated output pictures, PIX_X(n) 1060. In accordance with an embodiment of the invention, FMH-3 1005 may be dynamically configured.

The generated one or more motion compensated output pictures, PIX_X(n) 1060 may be utilized to adaptively compute a plurality of subsequent weights, for example, $w_1, w_2, w_3$ and $w_4$ for adaptively adjusting one or more parameters of a plurality of linear filters, for example, FIR-1 1018, FIR-2 1020 and FIR-3 1022 utilized for motion compensation.

In accordance with an embodiment of the invention, when three or more frames are utilized for motion estimation of the video sequence, a desired picture, PIX_Y(n) 1062 may be extracted from the video sequence to compute the plurality of subsequent weights, for example, $w_1, w_2, w_3$ and $w_4$. The switch 1030 may be enabled to select between the desired picture, PIX_Y(n) 1062 and the one or more motion compensated output pictures, PIX_X(n) 1060.

The summer 1028 may be enabled to generate an error signal, Error(n), based on combining the generated one or more motion compensated output pictures, PIX_X(n) 1060 and the extracted desired picture, PIX_Y(n) 1062 from the video sequence. The adaptive algorithm block 1026 may be enabled to adaptively compute the plurality of subsequent weights, for example, $w_1, w_2, w_3$ and $w_4$ based on the generated error signal, Error(n). The adaptive algorithm block 1026 may be enabled to use a least mean squares algorithm, for example, which may converge to an optimal solution $w_1, w_2, w_3$ and $w_4$, where $w_1+w_2+w_3+w_4=1$, for $w_1 \geq 0, w_2 \geq 0, w_3 \geq 0, w_4 \geq 0$. Notwithstanding, other adaptive algorithms may be utilized without limiting the scope of the invention.

Figure 11:
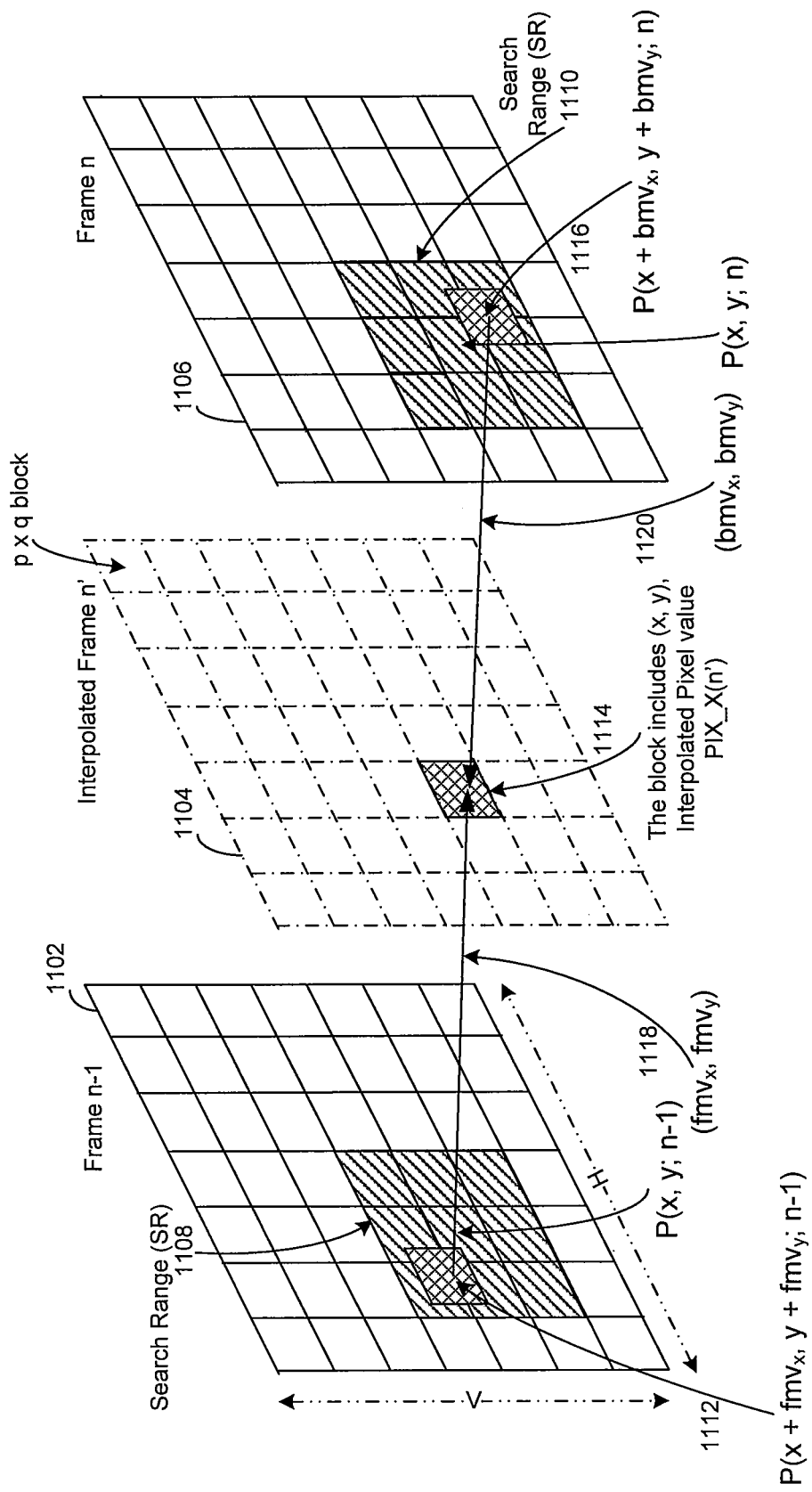
FIG. 11 is a block diagram illustrating exemplary motion estimation and compensation for a 2-frame architecture, in accordance with an embodiment of the invention.

FIG. 11 is a block diagram illustrating exemplary motion estimation and compensation for a 2-frame architecture, in accordance with an embodiment of the invention. Referring to FIG. 11, there is shown a previous frame, frame n−1 1102, a interpolated frame n' 1104, and a current frame, frame n 1106.

In accordance with an embodiment of the invention, an iterative algorithm, such as a least squares algorithm may be utilized to determine a interpolated picture PIX_X(n') estimated at frame n' 1104 for a block (x, y). The block 1114 in the frame n' 1104 may comprise an interpolated picture, PIX_X(n'). The block 1112 in the search range 1108 of the frame n−1 1102 may be utilized to generate the interpolated picture, PIX_X(n') of the block 1114 based on $P(x+fmv_x, y+fmv_y; n-1)$, where $(fmv_x, fmv_y)$ represents the forward motion vector of block 1114 in the interpolated frame n' 1104. The block 1116 in the search range 1110 of the frame n 1106 may be utilized to generate the interpolated picture, PIX_X (n') of the block 1116 based on $P(x+bmv_x, y+bmv_y; n)$, where $(bmv_x, bmv_y)$ represents the backward motion vector of block 1116 in the interpolated frame n' 1104.

In a 2-frame architecture, an interpolated frame may not be present in an original video sequence. Accordingly, an independent desired picture may not be available in the video sequence for generating the weight parameters $w_1, w_2, w_3$ and $w_4$ for FMH-3 705. Accordingly, a $P(x+fmv_x, y+fmv_y; n-1)$ and $P(x+bmv_x, y+bmv_y; n)$ may be utilized as the desired pictures for a 2-frame architecture.

Figure 12:
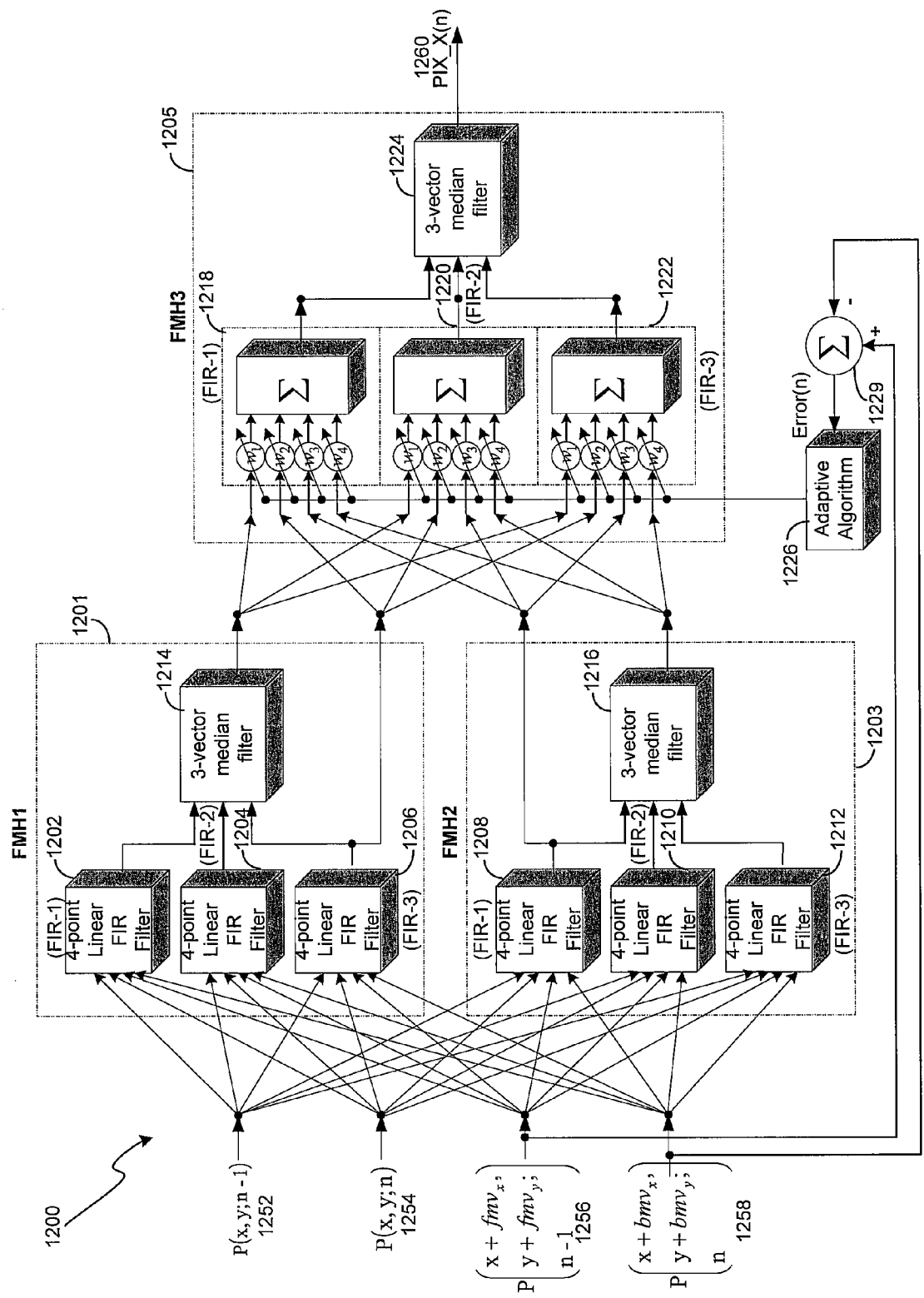
FIG. 12 is a block diagram of an exemplary adaptive temporal interpolation filtering system with 2-frame motion estimation, in accordance with an embodiment of the invention.

FIG. 12 is a block diagram of an exemplary adaptive temporal interpolation filtering system with 2-frame motion estimation, in accordance with an embodiment of the invention. Referring to FIG. 12, there is shown a two-stage adaptive temporal interpolation filtering system 1200. The two-stage adaptive temporal interpolation filtering system 1200 may comprise a first stage and a second stage of FIR median hybrid filters (FMH). The first FMH stage may comprise two FMH filters, for example, FMH-1 1201 and FMH-2 1203. The second stage may comprise one FMH filter, for example, FMH-3 1205. The FMH-1 1201 may comprise a plurality of linear FIR filters, for example, FIR-1 1202, FIR-2 1204 and FIR-3 1206, and a vector median filter 1214. The FMH-2 1203 may comprise a plurality of linear FIR filters, FIR-1 1208, FIR-2 1210 and FIR-3 1212, and a vector median filter 1216. The FMH-3 1205 may comprise a plurality of linear FIR filters, FIR-1 1218, FIR-2 1220 and FIR-3 1222, and a vector median filter 1224.

In accordance with an embodiment of the invention, each of the plurality of linear FIR filters, for example, the FIR-1 1202, the FIR-2 1204, the FIR-3 1206, the FIR-1 1208, the FIR-2 1210 and the FIR-3 1212 may be 4-point linear FIR filters. Each of the plurality of linear filters, for example, the FIR-1 1202, the FIR-2 1204, the FIR-3 1206, the FIR-1 1208, the FIR-2 1210 and the FIR-3 1212 may be enabled to receive four or more input pictures. For example, the FIR-1 1202 may be enabled to receive at least four inputs, such as, the picture A 1252 [P(x, y; n−1)], the picture B 1254 [P(x, y; n)], the picture C 1256 [$P(x+fmv_x, y+fmv_y; n-1)$], and the picture D 1258 [$P(x+bmv_x, y+bmv_y; n)$] and generate an output to the vector median filter 1214. Accordingly, two or more of the input pictures may be motion-compensated input pictures, for example, the picture C 1256 [$P(x+fmv_x, y+fmv_y; n-1)$] and the picture D 1258 [$P(x+bmv_x, y+bmv_y; n)$] and two or more of the input pictures may be non-motion compensated input pictures, for example, the picture A 1252 [P(x, y; n−1)] and the picture B 1254 [P(x, y; n)]. The structure of a 4-point linear FIR filter may be substantially as described with respect to FIG. 6A.

In accordance with an embodiment of the invention, each of the plurality of vector median filters, for example, 1214, 1216 and 1224 may be 3-point vector median filters. Each of the plurality of vector median filters, for example, the vector median filters 1214, 1216 and 1224 may comprise suitable logic, circuitry and/or code that may be enabled to receive at least three inputs, such as, $\vec{X}_1, \vec{X}_2,$ and $\vec{X}_3$ and determine the median output $\vec{X}_{VM}$. For example, the vector median filter 1214 may be enabled to receive an input from each of the 4-point FIR linear filters, FIR-1 1202, FIR-2 1204 and FIR-3 1206 and generate a vector median output to FMH-3 1205.

The plurality of vector median filters, for example, the vector median filters 1214, 1216 and 1224 may be 3-point vector median filters and comprise a plurality of filter coefficients $w_1$, $w_2$, $w_3$ and $w_4$, and a summer. The structure of a 3-point vector median filter may be substantially as described with respect to FIG. 6B.

The plurality of linear filters, for example, the FIR-1 1202, the FIR-2 1204, the FIR-3 1206, the FIR-1 1208, the FIR-2 1210 and the FIR-3 1212 may be enabled to generate a plurality of linear filtered output pictures based on filtering the four or more input pictures, for example, the picture A 1252, the picture B 1254, the picture C 1256, and the picture D 1258. The plurality of vector median filters, for example, 1214 and 1216 may be enabled to vector median filter each of the generated plurality of linear filtered output pictures to generate a plurality of filtered input pictures. In accordance with an embodiment of the invention, each of the FMH filters, FMH-1 1201 and FMH-2 1203 may be statically configured.

In the second stage of the adaptive temporal interpolation filtering system 1200, each 4-point linear FIR filter, for example, the FIR-1 1218, the FIR-2 1220 and the FIR-3 1222 may comprise suitable logic, circuitry and/or code that may be enabled to receive at least four inputs, such as, outputs of the vector median filters 1214 and 1216, and outputs of the linear FIR filters FIR-3 1206 and FIR-1 1208 and generate an output to the vector median filter 1224 in FMH-3 1205.

The vector median filter 1224 may comprise suitable logic, circuitry and/or code that may be enabled to receive at least three inputs, such as, $\vec{X}_1, \vec{X}_2,$ and $\vec{X}_3$ and determine the median output $\vec{X}_{VM}$. For example, the vector median filter 1224 may be enabled to receive an input from each of the 4-point FIR linear filters, FIR-1 1218, FIR-2 1220 and FIR-3 1222 and generate a motion compensated output picture, PIX_X(n) 1260.

The second stage may comprise one or more FMH filters, for example, FMH-3 1205. The FMH-3 1205 may comprise a plurality of linear filters, for example, FIR-1 1218, FIR-2 1220 and FIR-3 1222 and a vector median filter 1224. The FMH-3 1205 may be enabled to receive four or more filtered input pictures at each of three or more of the plurality of linear filters, for example, the FIR-1 1218, the FIR-2 1220 and the FIR-3 1222. Each of the plurality of linear filters, for example, the FIR-1 1218, the FIR-2 1220 and the FIR-3 1222 in FMH-3 1205 may be enabled to generate a plurality of linear filtered output pictures based on filtering the four or more filtered input pictures. The vector median filter 1224 may be enabled to vector median filter each of the generated plurality of linear filtered output pictures to generate one or more motion compensated output pictures, PIX_X(n) 1260. In accordance with an embodiment of the invention, FMH-3 1205 may be dynamically configured.

The generated one or more motion compensated output pictures, PIX_X(n) 1260 may be utilized to adaptively compute a plurality of subsequent weights, for example, $w_1$, $w_2$, $w_3$ and $w_4$ for adaptively adjusting one or more parameters of a plurality of linear filters, for example, the FIR-1 1218, the FIR-2 1220 and the FIR-3 1222 utilized for motion compensation.

In accordance with an embodiment of the invention, when two frames are utilized for motion estimation of the video sequence, the motion compensated pictures, P(x+fmv$_x$, y+fmv$_y$; n−1) 1256 and P(x+bmv$_x$, y+bmv$_y$; n) 1258 may be used to compute the plurality of subsequent weights, for example, $w_1$, $w_2$, $w_3$ and $w_4$. The summer 1229 may be enabled to generate an error signal, Error(n), based on combining the motion compensated pictures, P(x+fmv$_x$, y+fmv$_y$; n−1) 1256 and P(x+bmv$_x$, y+bmv$_y$; n) 1258. The adaptive algorithm block 1226 may be enabled to adaptively compute the plurality of subsequent weights, for example, $w_1$, $w_2$, $w_3$ and $w_4$ based on the generated error signal, Error(n). The adaptive algorithm block 1226 may be enabled to use a least mean squares algorithm, for example, which may converge to an optimal solution $w_1$, $w_2$, $w_3$ and $w_4$, where $w_1+w_2+w_3+w_4=1$, for $w_1 \geq 0$, $w_2 \geq 0$, $w_3 \geq 0$, $w_4 \geq 0$. Notwithstanding, other adaptive algorithms may be utilized without limiting the scope of the invention.

Figure 13:
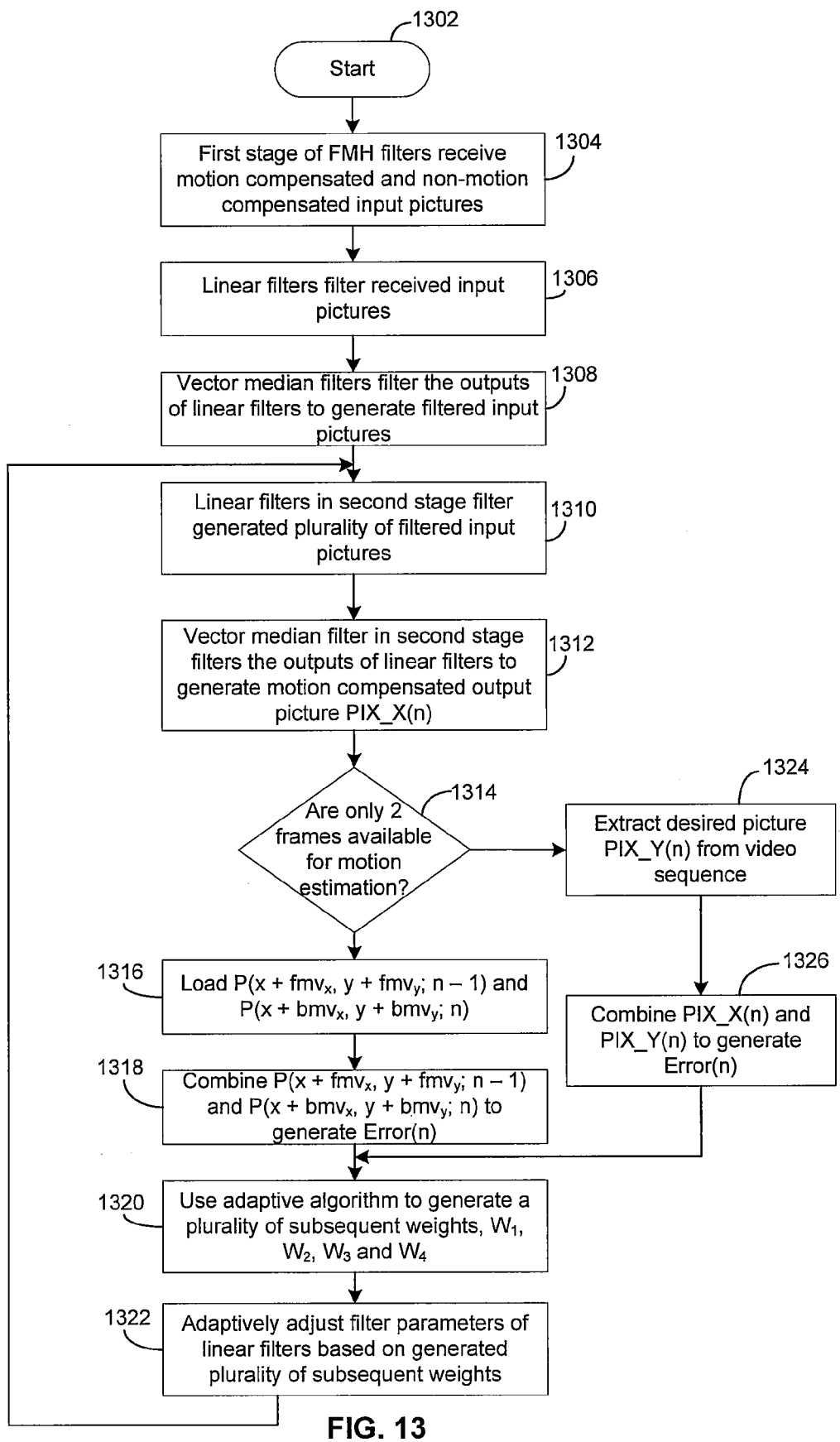
FIG. 13 is a flow chart illustrating exemplary steps for adaptive temporal interpolation filtering for motion compensation, in accordance with an embodiment of the invention.

FIG. 13 is a flow chart illustrating exemplary steps for adaptive temporal interpolation filtering for motion compensation, in accordance with an embodiment of the invention. Referring to FIG. 13, exemplary steps may begin at step 1302. In step 1304, a first stage of filtering may comprise two FMH filters that may receive a plurality of motion compensated pictures and a plurality of non-motion compensated pictures. In step 1306, the received plurality of motion compensated pictures and non-motion compensated pictures may be filtered by a plurality of linear filters. In step 1308, the outputs of the linear filters may be vector median filtered to generate a plurality of filtered input pictures to the second stage of filtering. In step 1310, the generated plurality of filtered input pictures may be filtered by a plurality of linear filters. In step 1312, the outputs of the linear filters may be vector median filtered to generate one or more motion compensated output pictures, PIX_X(n).

In step 1314, it may be determined whether only two frames are available for motion estimation of a video sequence. In instances where only two frames are available for motion estimation of a video sequence, control passes to step 1316. In step 1316, the motion compensated pictures of a previous frame, P(x+fmv$_x$, y+fmv$_y$; n−1) 1256 and the motion compensated pictures of a current frame P(x+bmv$_x$, y+bmv$_y$; n) 1258 may be loaded. In step 1318, the motion compensated pictures, P(x+fmv$_x$, y+fmv$_y$; n−1) 1256 and P(x+bmv$_x$, y+bmv$_y$; n) 1258 may be combined to generate an error signal. In step 1320, an adaptive algorithm may be utilized to generate a plurality of subsequent weights, for example, $w_1$, $w_2$, $w_3$ and $w_4$, based on the generated error signal. In step 1322, the generated plurality of subsequent weights, for example, $w_1$, $w_2$, $w_3$ and $w_4$, may be utilized to adaptively adjust one or more parameters of a plurality of linear filters. Control then returns to step 1310.

In instances where three or more frames are available for motion estimation of a video sequence, control passes to step 1324. In step 1324, a desired picture, PIX_Y(n) may be extracted from the video sequence. In step 1326, the generated one or more motion compensated output pictures, PIX_X(n) and the extracted desired picture, PIX_Y(n) may be combined to generate an error signal. Control then passes to step 1320.

In accordance with various embodiments of the invention, a method and system for adaptive temporal interpolation filter for motion compensation may comprise one or more circuits in a video enabled device 100 operable to compute a plurality of weights, for example, $w_1$, $w_2$, $w_3$ and $w_4$ for adaptively adjusting one or more parameters of a plurality of linear filters, for example, FIR-1 1218, FIR-2 1220 and FIR-3 1222 utilized for motion compensation. The FIR median hybrid (FMH) filter 1205 may be enabled to generate one or more motion compensated output pictures, PIX_X(n) 1260 based on vector median filtering a plurality of linear filtered output pictures generated by the plurality of linear filters, for example, the FIR-1 1218, the FIR-2 1220 and the FIR-3 1222. The generated one or more motion compensated output pictures, PIX_X(n) 1260 may be utilized to adaptively compute a plurality of subsequent weights, for example, $w_1$, $w_2$, $w_3$ and $w_4$. The motion compensated pictures of a previous frame, $P(x+fmv_x, y+fmv_y; n-1)$ 1256 and motion compensated pictures of a current frame $P(x+bmv_x, y+bmv_y; n)$ 1258 may be utilized when two frames are available for motion estimation of a video sequence. The summer 1229 may be enabled to generate an error signal, Error(n), based on combining the motion compensated pictures, $P(x+fmv_x, y+fmv_y; n-1)$ 1256 and $P(x+bmv_x, y+bmv_y; n)$ 1258. The adaptive algorithm block 1226 may be enabled to adaptively compute the plurality of subsequent weights, for example, $w_1$, $w_2$, $w_3$ and $w_4$ based on the generated error signal, Error(n).

In accordance with an embodiment of the invention, when three or more frames are utilized for motion estimation of the video sequence, one or more circuits may be enabled to extract a desired picture, PIX_Y(n) 1062 from the video sequence to compute the plurality of subsequent weights, for example, $w_1$, $w_2$, $w_3$ and $w_4$. The summer 1028 may be enabled to generate an error signal, Error(n), based on combining the generated one or more motion compensated output pictures, PIX_X(n) 1060 and the extracted desired picture, PIX_Y(n) 1062 from the video sequence. The adaptive algorithm block 1026 may be enabled to adaptively compute the plurality of subsequent weights, for example, $w_1$, $w_2$, $w_3$ and $w_4$ based on the generated error signal, Error(n).

The first of two or more stages of filtering utilized to generate the one or more motion compensated output pictures, PIX_X(n) 1260 may comprise two or more finite impulse response (FIR) median hybrid (FMH) filters, for example, FMH-1 1201 and FMH-2 1203. Each of the two or more FMH filters, for example, FMH-1 1201 and FMH-2 2 1203 may comprise three or more of the plurality of linear filters and one or more vector median filters. For example, FMH-1 1201 may comprise a plurality of linear FIR filters, the FIR-1 1202, the FIR-2 1204 and the FIR-3 1206, and a vector median filter 1214. The FMH-2 1203 may comprise a plurality of linear FIR filters, the FIR-1 1208, the FIR-2 1210 and the FIR-3 1212, and a vector median filter 1216. Each of the three or more of the plurality of linear filters may be enabled to receive four or more input pictures. For example, the FIR-1 1202 may be enabled to receive at least four inputs, such as, the picture A 1252 [P(x, y; n−1)], the picture B 1254 [P(x, y; n)], the picture C 1256 [$P(x+fmv_x, y+fmv_y; n-1)$], and the picture D 1258 [$P(x+bmv_x, y+bmv_y; n)$] and generate an output to the vector median filter 1214. Accordingly, two or more of the input pictures may be motion-compensated input pictures, for example, the picture C 1256 [$P(x+fmv_x, y+fmv_y; n-1)$] and the picture D 1258 [$P(x+bmv_x, y+bmv_y; n)$] and two or more of the input pictures may be non-motion compensated input pictures, for example, the picture A 1252 [P(x, y; n−1)] and the picture B 1254 [P(x, y; n)]. The structure of a 4-point linear FIR filter may be substantially as described with respect to FIG. 6A.

The plurality of linear filters, for example, FIR-1 1202, FIR-2 1204, FIR-3 1206, FIR-1 1208, FIR-2 1210 and FIR-3 1212 may be enabled to generate a plurality of linear filtered output pictures based on filtering the four or more input pictures, for example, the picture A 1252, the picture B 1254, the picture C 1256, and the picture D 1258. The plurality of vector median filters, for example, 1214 and 1216 may be enabled to vector median filter each of the generated plurality of linear filtered output pictures.

The second of two or more stages of filtering may comprise one or more finite impulse response (FIR) median hybrid (FMH) filters, for example, the FMH-3 1205. The FMH filter, for example, the FMH-3 1205 may comprise three or more of the plurality of linear filters and one or more vector median filters. For example, the FMH-3 1205 may comprise a plurality of linear FIR filters, for example, the FIR-1 1218, the FIR-2 2 1220 and the FIR-3 1222, and the vector median filter 1224. The FMH-3 1205 may be enabled to receive four or more filtered input pictures at each of three or more of the plurality of linear filters, for example, the FIR-1 1218, the FIR-2 1220 and the FIR-3 1222. Each of the three or more of the plurality of linear filters, for example, the FIR-1 1218, the FIR-2 1220 and the FIR-3 1222 in the FMH-3 1205 may be enabled to generate a plurality of linear filtered output pictures based on filtering the four or more filtered input pictures. Each of the FMH filters, the FMH-1 1201 and the FMH-2 1203 may be statically configured, and the FMH-3 1205 may be dynamically configured.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for adaptive temporal interpolation filtering for motion compensation.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:
1. A method for signal processing, the method comprising:
computing a plurality of weights for adaptively adjusting one or more parameters of a plurality of linear filters utilized for motion compensation in a video enabled device;

generating one or more motion compensated output pictures based on vector median filtering a plurality of linear filtered output pictures generated by said plurality of linear filters;

extracting a desired picture from a video sequence when three or more frames are utilized for motion estimation of said video sequence; and adaptively computing a plurality of subsequent weights utilizing said generated one or more motion compensated output pictures and said extracted desired picture.

2. The method according to claim 1, comprising generating an error signal based on combining said generated one or more motion compensated output pictures and said extracted desired picture from said video sequence.

3. The method according to claim 2, comprising adaptively computing said plurality of subsequent weights based on said generated error signal.

4. The method according to claim 1, wherein a first of two or more stages of filtering utilized to generate said one or more motion compensated output pictures comprises two or more finite impulse response (FIR) median hybrid (FMH) filters.

5. The method according to claim 4, wherein each of said two or more FMH filters comprises three or more of said plurality of linear filters and one or more vector median filters.

6. The method according to claim 5, comprising receiving four or more input pictures at each of said three or more of said plurality of linear filters, wherein two or more of said input pictures are motion-compensated input pictures and two or more of said input pictures are non-motion compensated input pictures.

7. The method according to claim 6, comprising generating said plurality of linear filtered output pictures based on filtering said four or more input pictures by each of said three or more of said plurality of linear filters.

8. The method according to claim 7, comprising vector median filtering each of said generated plurality of linear filtered output pictures by said one or more vector median filters.

9. The method according to claim 1, wherein a second of two or more stages of filtering comprises one or more finite impulse response (FIR) median hybrid (FMH) filters.

10. The method according to claim 9, comprising receiving four or more filtered input pictures at each of three or more of said plurality of linear filters in said one or more FMH filters.

11. The method according to claim 10, comprising generating said plurality of linear filtered output pictures based on filtering said four or more filtered input pictures by each of said three or more of said plurality of linear filters in said one or more FMH filters.

12. A system for processing signals, the system comprising:

one or more circuits for use in a video enabled device, wherein said one or more circuits is operable to compute a plurality of weights for adaptively adjusting one or more parameters of a plurality of linear filters utilized for motion compensation;

said one or more circuits is operable to generate one or more motion compensated output pictures based on vector median filtering a plurality of linear filtered output pictures generated by said plurality of linear filters; and said one or more circuits is operable to extract a desired picture from a video sequence when three or more frames are utilized for motion estimation of said video sequence, wherein said generated one or more motion compensated output pictures and said extracted desired picture are utilized to adaptively compute a plurality of subsequent weights.

13. The system according to claim 12, wherein said one or more circuits is operable to generate an error signal based on combining said generated one or more motion compensated output pictures and said extracted desired picture from said video sequence.

14. The system according to claim 13, wherein said one or more circuits is operable to adaptively compute said plurality of subsequent weights based on said generated error signal.

15. The system according to claim 12, wherein a first of two or more stages of filtering utilized to generate said one or more motion compensated output pictures comprises two or more finite impulse response (FIR) median hybrid (FMH) filters.

16. The system according to claim 15, wherein each of said two or more FMH filters comprises three or more of said plurality of linear filters and one or more vector median filters.

17. The system according to claim 16, comprising three or more of said plurality of linear filters operable to receive four or more input pictures, wherein two or more of said input pictures are motion-compensated input pictures and two or more of said input pictures are non-motion compensated input pictures.

18. The system according to claim 17, wherein said three or more of said plurality of linear filters are operable to generate said plurality of linear filtered output pictures based on filtering said four or more input pictures.

19. The system according to claim 18, comprising one or more vector median filters operable to vector median filter each of said generated plurality of linear filtered output pictures.

20. The system according to claim 12, wherein a second of two or more stages of filtering comprises one or more FMH filters.

21. The system according to claim 20, comprising three or more of said plurality of linear filters operable to receive four or more filtered input pictures in said one or more FMH filters.

22. The system according to claim 21, wherein said three or more of said plurality of linear filters are operable to generate said plurality of linear filtered output pictures based on filtering said four or more filtered input pictures in said one or more FMH filters.

* * * * *